(12) United States Patent
Morita et al.

(10) Patent No.: US 7,972,510 B2
(45) Date of Patent: Jul. 5, 2011

(54) FILTRATION APPARATUS

(75) Inventors: Tooru Morita, Osaka (JP); Shinsuke Kawabe, Osaka (JP)

(73) Assignee: Sumitomo Electric Fine Polymer, Inc., Osaka (JP)

( * ) Notice: Subject to any disclaimer, the term of this patent is extended or adjusted under 35 U.S.C. 154(b) by 0 days.

(21) Appl. No.: 12/306,720

(22) PCT Filed: Jun. 25, 2007

(86) PCT No.: PCT/JP2007/062719
§ 371 (c)(1),
(2), (4) Date: Dec. 26, 2008

(87) PCT Pub. No.: WO2008/001730
PCT Pub. Date: Jan. 3, 2008

(65) Prior Publication Data
US 2009/0236280 A1  Sep. 24, 2009

(30) Foreign Application Priority Data
Jun. 26, 2006  (JP) .................................. 2006-175129

(51) Int. Cl.
B01D 63/00 (2006.01)
C02F 1/44 (2006.01)
(52) U.S. Cl. .................................. 210/321.69; 210/408
(58) Field of Classification Search .................. 210/321, 210/321.69
See application file for complete search history.

(56) References Cited

U.S. PATENT DOCUMENTS

| | | | | |
|---|---|---|---|---|
| 4,025,436 A | * | 5/1977 | Tsuda et al. | 210/321.8 |
| 4,605,500 A | * | 8/1986 | Takemura et al. | 210/321.78 |
| 4,756,875 A | * | 7/1988 | Tajima et al. | 376/313 |
| 5,202,023 A | * | 4/1993 | Trimmer et al. | 210/321.8 |
| 5,248,424 A | * | 9/1993 | Cote et al. | 210/636 |
| 6,685,832 B2 | * | 2/2004 | Mahendran et al. | 210/321.8 |
| 7,160,454 B2 | * | 1/2007 | Vossenkaul et al. | 210/321.67 |
| 7,276,155 B1 | * | 10/2007 | Ricketts | 210/151 |
| 2007/0163942 A1 | * | 7/2007 | Tanaka et al. | 210/321.89 |

FOREIGN PATENT DOCUMENTS
EP        0163900 A2    12/1985
(Continued)

OTHER PUBLICATIONS

Patent Abstracts of Japan, Publication No. 06-254582, dated Sep. 13, 1994, 1 page.

(Continued)

*Primary Examiner* — Krishnan S Menon
*Assistant Examiner* — Allison Gionta
(74) *Attorney, Agent, or Firm* — Osha Liang LLP

(57) ABSTRACT

A filtration apparatus for performing solid-liquid separation by immersing a plurality of hollow fiber membranes in a to-be-treated liquid containing a suspended component includes the hollow fiber membranes folded double, a treated liquid collection means communicated with an open end of each of the hollow fiber membranes, a holding member for holding a bent portion of each of the hollow fiber membranes with a gap formed between the bent portion and the holding member, and a gas-jetting means for jetting a cleaning gas from the bent side of each of the hollow fiber membranes to a side of the open end. A gap for flowing the gas jetted by the gas-jetting means is formed between the hollow fiber membranes and the holding member or/and in at least one part of gaps between the hollow fiber membranes.

3 Claims, 23 Drawing Sheets

FOREIGN PATENT DOCUMENTS

| | | | |
|---|---|---|---|
| JP | 4-64727 | | 10/1992 |
| JP | 6-254582 | | 9/1994 |
| JP | 7-024264 | | 1/1995 |
| JP | 7-61420 | | 7/1995 |
| JP | 9010561 A | * | 1/1997 |
| JP | 10286440 A | | 10/1998 |
| JP | 11033367 A | | 2/1999 |
| JP | 2004-337764 | | 12/2004 |
| JP | 203254 | * | 8/2007 |
| WO | 2007051551 A1 | | 5/2007 |

OTHER PUBLICATIONS

Patent Abstracts of Japan, Publication No. 2004-337764, dated Dec. 2, 2004, 1 page.

Patent Abstracts of Japan, Publication No. 60-206414, dated Oct. 18, 1985, 1 page (corresponds to JP4-64727 cited above).

Patent Abstracts of Japan, Publication No. 07-024264, dated Jan. 27, 1995, 1 page.

Patent Abstracts of Japan, Publication No. 63-093308, dated Apr. 23, 1988, 1 page (corresponds to JP7-61420 cited above).

International Search Report issued in PCT/JP2007/062719, mailed on Oct. 16, 2007, 3 pages.

Extended European Search Report in EP Application No. 07767525.4-2113, dated Apr. 8, 2011 (12 pages).

Patent Abstracts of Japan, Publication No. 10286440; Publication Date Oct. 27, 1998 (1 page).

Patent Abstracts of Japan, Publication No. 11033367; Publication Date Feb. 9, 1999 (1 page).

* cited by examiner

Fig. 16A
Fig. 16B
Fig. 16C
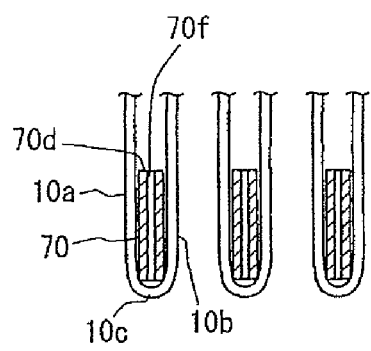
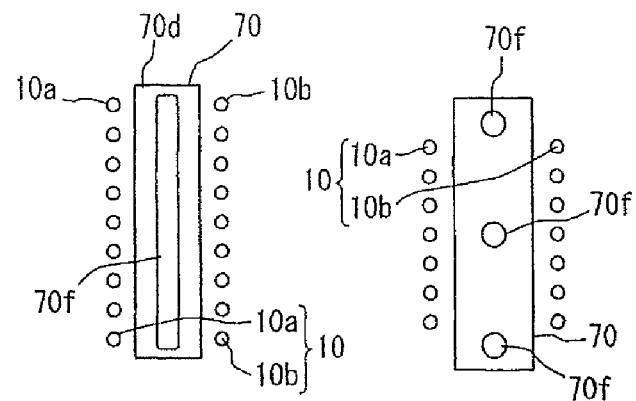
Fig. 17A
Fig. 17B
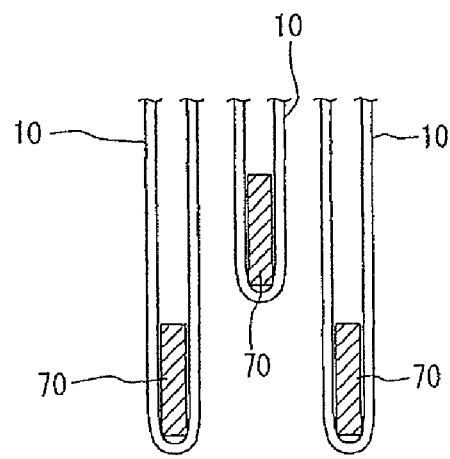
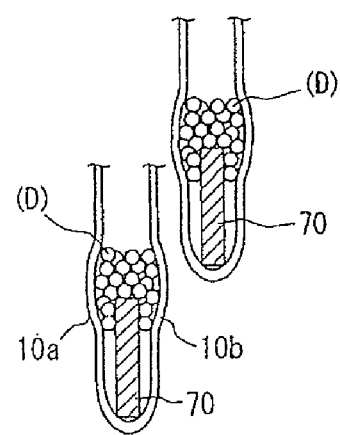

GAS-DIFFUSING PLATE

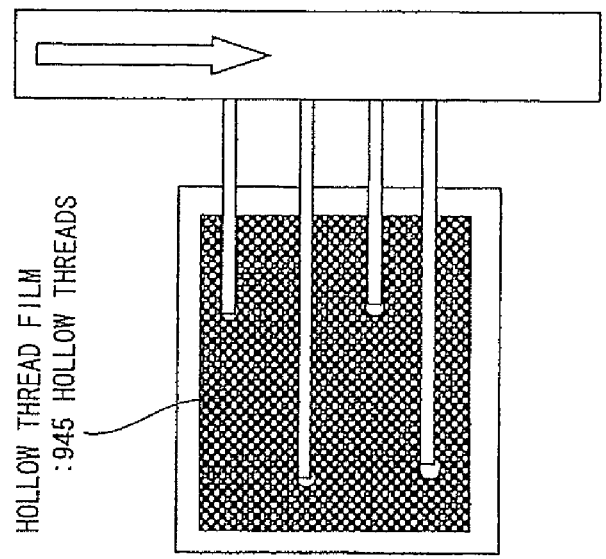
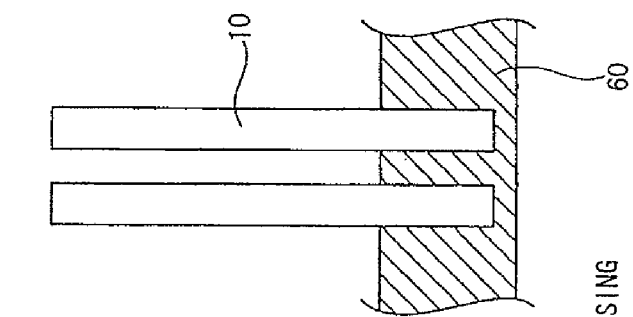
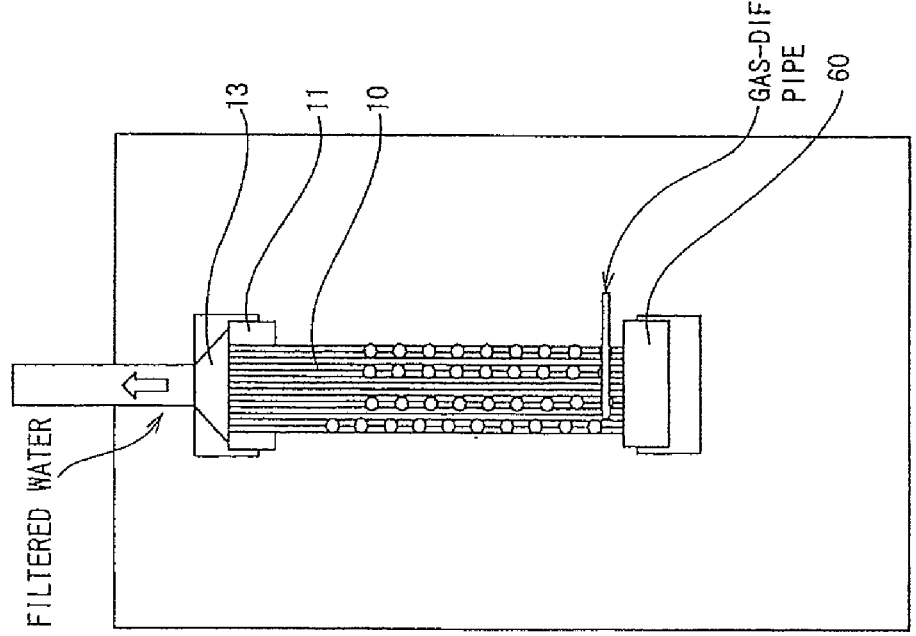

FILTRATION APPARATUS

TECHNICAL FIELD

The present invention relates to a sucking filtration apparatus of an immersion type or a filtration apparatus of an external pressure type for performing solid-liquid separation by immersing a large number of hollow fiber membranes arranged side by side in a to-be-treated liquid containing a suspended component so that treated liquid permeates the hollow fiber membranes, and more particularly to a filtration apparatus including cleaning means having a simple construction for removing the suspended component which has attached to the hollow fiber membranes.

BACKGROUND ART

A membrane module in which a plurality of hollow fiber membranes is disposed collectively and circularly and one end or both ends of the hollow fiber membranes is fixed by a fixing member with the one end or both ends of the hollow fiber membranes open to form a water collection portion is mounted and used for the sucking filtration apparatus of the immersion type or the filtration apparatus of the external pressure-type.

The membrane module of this kind is widely used in a water-cleaning field such as cleaning of water of rivers, lakes, and marshes. In recent years, there is a tendency for the membrane module to be used not only in the water-cleaning field, but also in a filed of treating highly polluted water, for example, filtration of secondary and tertiary treatment of sewage, drainage, industrial wastewater, and industrial water.

As one application of highly polluted water treatment, a waste water treatment system that uses a membrane bioreactor process (MBR, hereinafter may be referred to as "membrane separation active sludge method") by means of a membrane module is becoming widely used. Because the membrane separation active sludge method can be carried out for the high-concentration active sludge, the membrane separation active sludge method is capable of decreasing the volume of an aeration tank and eliminates the need for using a precipitation tank and a sludge concentration tank. Thus the membrane separation active sludge method has an advantage that the installation area of the filtration apparatus can be made smaller than that of the filtration apparatus used in a conventional combined water-purifying tank method. In addition, the membrane separation active sludge method has another advantage that it is capable of purifying water in a higher quality than the conventional method.

Regardless of whether it is used for water purification or for highly polluted water treatment, when a filtration apparatus performs filtration treatment continuously by means of a membrane module, suspended ingredient that is contained in raw water, which is water to-be-treated, becomes deposited on the surfaces of membranes or between the membranes. The deposition of the suspended ingredient causes clogging of the membranes. That is, hollow fiber membranes adhere to each other and integrate with each other through a deposit, and the effective membrane area of the hollow fiber membranes inside the membrane module decreases, which leads to a decrease in a penetration flow rate.

Therefore a cleaning operation of removing the deposit on the membrane surface is essential. As a method carried out in most cleaning operations, deposit is peeled from a membrane surface by air bubbling which imparts vibration to hollow fiber membranes by means of bubbles supplied by introducing air from below the membrane module with the to-be-treated liquid filled in an immersion tank and by utilization of the flow of the to-be-treated liquid generated by supplied air.

For example, in Japanese Patent Application Laid-Open No. 7-24264 (patent document 1), as shown in FIG. 26, in the filtration method of a liquid by continually or intermittently performing air bubbling for the hollow fiber membranes 103 by means of bubbles supplied from the air-diffusing hole 102a of the air-diffusing plate 102 provided below the sheet-shaped flat hollow fiber membrane modules 101, the membrane modules 101 are disposed with the sheet surface disposed vertically and the hollow fiber membranes disposed horizontally to vibrate only the hollow fiber membranes 103 by the air bubbling to generate a swirling flow.

In the filter disclosed in Examined Japanese Patent Publication No. 7-61420(patent document 2), as shown in FIG. 27, a large number of the hollow fiber membrane filtration membranes 110 are arranged inside the outer cylinder 111, and the porous pipes 112 are disposed in the bundle of the hollow fiber membranes. Air bubbling is performed by introducing air from below the porous pipes 112, and bubbles are lifted along the porous pipes 112 to generate an upward flow which vibrates the hollow fiber membranes.

[Patent document 1]: Japanese Patent Application Laid-Open No. 7-24264

[Patent document 2]: Examined Japanese Patent Publication No. 7-61420

DISCLOSURE OF THE INVENTION

Problem to be Solved by the Invention

But in the filtration method disclosed in Japanese Patent Application Laid-Open No. 7-24264 shown in FIG. 26, air is diffused in the range from the air-diffusing hole 102a of the air-diffusing plate 102 to the entire region of the hollow fiber membranes 103. To diffuse the air sufficiently, it is necessary to space the adjacent sheet-shaped flat hollow fiber membrane modules 101 to some extent, and hence it is difficult to install membranes at a high density. Therefore the membrane-installing part has a large volume. The filtration method has a problem that when air is diffused entirely from below the membrane module 101, only the surfaces of the hollow fiber membranes 103 are air-diffused, and insufficient air diffusion occurs between membranes and particularly in the neighborhood of the water-collecting portion where the membranes are liable to be clogged. The filtration method has another problem that the hollow fiber membranes are liable to be broken because the amplitude of the membranes is large in the vicinity of the water-collecting portion, namely, in the vicinity of the hollow fiber membranes-bonded portions, and a load is applied thereto. Thus the hollow fiber membranes are liable to be broken in the vicinity of the bonded portions thereof.

In the filter described in Examined Japanese Patent Publication No. 7-61420 shown in FIG. 27, a plurality of the porous pipes 112 is merely inserted into the bundle of the hollow fiber membranes composed of a large number of the hollow fiber membrane filtration membranes 110 circularly arranged. Thus the filter has a problem that an insufficient air diffusion is performed between the membranes.

To improve the above-described problems, it is conceivable to form a plurality of gas-jetting holes in the pipe to provide each hollow fiber membrane with the highest possible air diffusion effect. But a plurality of the gas-jetting holes generates a larger amount of air than a necessary amount, which costs an extra running cost. Further there is a variation in the amount of air jetted from the gas-jetting holes.

There is a large difference in the amount of air according to the distance between an air source and the gas-jetting holes.

The present invention has been made in view of the above-described problems. It is an object of the present invention to provide a filtration apparatus that removes a suspended component, efficiently by means of air bubbles, which deposited on surfaces of hollow fiber membranes or between membranes with the elapse of time in which filtration operation is performed by using the hollow fiber membranes.

Means for Solving the Problem

To solve the above-described problems, the present invention provides a sucking filtration apparatus of an immersion type or a filtration apparatus of an external pressure type for performing solid-liquid separation by immersing a plurality of hollow fiber membranes in a to-be-treated liquid containing a suspended component so that a treated liquid permeates the hollow fiber membranes, including:

the hollow fiber membranes folded double;

a treated liquid collection means communicated with an open end, of each of the hollow fiber membranes, which is disposed opposite to a bent side of each of the hollow fiber membranes;

a holding member for holding a bent portion of each of the hollow fiber membranes with a gap formed between the bent portion of each of the hollow fiber membranes and the holding member; and a gas-jetting means for jetting a cleaning gas from the bent side of each of the hollow fiber membranes to a side of the open end of each of the hollow fiber membranes, wherein a gap for flowing the gas jetted by the gas-jetting means is formed between the hollow fiber membranes held by the holding member and the holding member or/and in at least one part of gaps between the hollow fiber membranes.

In the filtration apparatus of the present invention, normally the hollow fiber membranes are disposed in the to-be-treated liquid by setting an axial direction thereof as a vertical direction, with the open end of each of the hollow fiber membranes disposed at an upper side thereof and with other end of each of the hollow fiber membranes supported by the holding member disposed at a lower side thereof; and the gas-jetting means is disposed below the holding member.

In the filtration apparatus of the present invention, by holding the hollow fiber membranes by the holding member with the gap provided between the hollow fiber membrane and the holding member, the gas jetted by the gas-jetting means can be flowed through the gap in the axial direction of the hollow fiber membranes along the peripheral surfaces (membrane surface) thereof. It is possible to vibrate all the hollow fiber membranes reliably and efficiently by the flow of the gas and the flow of the to-be-treated liquid generated by the flow of the gas and in addition, obtain the effect of removing the suspended component which has attached to the membrane surfaces of the hollow fiber membranes by peel-off owing to the flow of the liquid along the surfaces thereof.

In the present invention, because the hollow fiber membranes are folded double and the bent portions thereof are held by the holding member, the hollow fiber membranes can be held by the holding member with the gap formed between the adjacent hollow fiber membranes. Thereby it is possible to form a duct for the gas jetted from below the holding member along the membrane surfaces of the hollow fiber membranes. Further because the gas can be sufficiently supplied to the lower side of each of the hollow fiber membranes including the lower-end bent portion thereof, it is possible to make it difficult for a solid content to deposit on the lower portion thereof. The filtration function little deteriorates because an effective membrane area hardly decreases and can be stabilized without decreasing the amount of water to be treated.

Further by folding each of the hollow fiber membranes double and holding the other end of each of the hollow fiber membranes by the holding member, it is unnecessary to use a member for fixing the other end of the hollow fiber membrane which is opposite to the one end of the hollow fiber membrane coupled to the treated liquid collection means. Thus the filtering apparatus has a simple construction.

The gas-jetting means for cleaning use is disposed below the holding member and jets the gas from the other end of each of the hollow fiber membranes to the one end thereof. In the present invention, because the gap is formed between the holding member and each of the hollow fiber membranes, the gas supplied by one pressurized gas supply pipe is flowed along the membrane surface of each of the hollow fiber membranes through each gap to generate bubbling. Therefore it is possible to efficiently remove the suspended component which has deposited on the surface of the hollow fiber membranes by the peel-off and decrease the cost required to jet the gas. It is preferable that the gas-jetting means is disposed below the holding member at an interval of 100 to 500 mm.

Air is used as the cleaning gas that is supplied to the filtration apparatus. The pressure of the air is set to 10 to 70 kPa. It is more favorable to use a pressurized air having 20 to 50 kPa. The pressurized air may be supplied by using a blower or by a compressor. Because the pressure of the pressurized air supplied by the compressor is too high and more expensive than the blower, the blower can be preferably used.

It is preferable that the introduction amount of the gas is set as small as possible in view of en electric power to be consumed to drive the blower, namely, a running cost. For example, the introduction amount of the gas with respect to a filtrate water amount of 100 L/hour set for the hollow fiber membrane module is appropriately set to the range of 0.1 to 5 Nm$^3$/hour and preferably 0.5 to 2 Nm$^3$/hour in dependence on the amount of the solid content to be separated from the filtrate water.

The configuration of the holding member is not limited to a specific configuration, but can be set to various configurations.

For example, the holding member may consist of a plate disposed in a direction orthogonal to the axial direction of the hollow fiber membranes; and the plate may have a plurality of a pair of through-holes proximately formed for one or a plurality of the hollow fiber membranes with adjacent pairs of the through-holes spaced at a predetermined interval; and both sides of the bent portion of one or a plurality of the hollow fiber membranes may be inserted through a pair of the through-holes with a gap provided between both sides of each of the hollow fiber membranes.

When a plurality of the hollow fiber membranes is penetrated through one through-hole with the hollow fiber membranes in contact with each other in the through-hole, it is preferable that one hollow fiber membrane contacts not more than three hollow fiber membranes. When one hollow fiber membrane contacts not more than three hollow fiber membranes, it is possible to secure the greater part of the peripheral surface of each hollow fiber membrane as a noncontact part, supposing that four hollow fiber membranes are disposed at an interval of 90 degrees.

It is preferable that the above-described plate is flat plate-shaped. By forming the plate having a simple configuration that the through-holes are formed therethrough, it is possible to decrease the manufacturing cost. In addition, by hooking one or a plurality of the hollow fiber membranes to the through-hole, it is possible to form the gap reliably on the periphery of each hollow fiber membrane and hold the hollow fiber membrane in position by the holding member.

One hollow fiber membrane or not less than two or a plurality of the hollow fiber membranes may be inserted through one through-hole. In consideration of efficiency in the peel-off removal of the suspended component, it is preferable that a filling rate of the hollow fiber membrane in the through-hole is set to not more than 70%. For example, when one hollow fiber membrane having an outer diameter of 2 mm is inserted through the through-hole, it is preferable that the through-hole is circular and has a diameter of 3 to 5 mm. When one hollow fiber membrane having an outer diameter of 3 mm is inserted through the through-hole, it is preferable that the through-hole is circular and has a diameter of 4 to 6 mm.

The configuration of the through-hole is not limited to a specific configuration, provided that the hollow fiber membrane can be inserted through the through-hole and that the gap is provided between the inner peripheral surface of the through-hole and the peripheral surface of the hollow fiber membrane. It is favorable that the through-hole is circular, oblong, elliptic, and rectangular slit-shaped. Considering the moldability and processability and the configuration of preventing the suspended component from attaching to the periphery of the through-hole, it is more favorable that the through-holes is circular or oblong.

To improve the efficiency of the peel-off removal by imparting the pressurized jetted gas to the vicinity of the hollow fiber membrane, dummy holes through which the hollow fiber membranes are not inserted respectively may be scatteringly formed. By forming the dummy holes, it is possible to prevent the suspended component which has peeled off the hollow fiber membranes from depositing on the plate.

It is possible that instead of the plate through which the through-holes are formed, a plurality of the double folded hollow fiber membranes is arranged side by side like a reed screen; and the holding member consisting of a round rod or a flat plate-shaped rod is inserted between both side portions of each of the hollow fiber membranes confronting each other with the bent portion thereof disposed therebetween to hold the bent portion.

More specifically, as the holding member for holding the double folded hollow fiber membranes, the rod for folding use is provided. With the double folded hollow fiber membranes arranged side by side, the rod is disposed in a central space between both side portions of each of the hollow fiber membranes with the rod in penetration through the hollow fiber membranes.

The above-described construction eliminates a work of inserting both side portions of each double folded hollow fiber membrane through the through-hole and is capable of holding a plurality of the hollow fiber membranes in a double folded state.

It is preferable that the hollow fiber membranes are arranged side by side closely or at certain intervals in the axial direction of the rod and that a block consisting of a plurality of the hollow fiber membranes is spaced at an interval of 2.0 to 10.0 mm from an adjacent block consisting of a plurality of the hollow fiber membranes.

More specifically, to enhance the filtration performance, it is preferable to closely dispose the hollow fiber membranes at predetermined intervals. But it is necessary to secure a duct for the jetted gas to reliably vibrate the hollow fiber membranes and secure a space in which by making a liquid flow on the surface of each hollow fiber membrane, the suspended component which has attached to the membrane surface of the hollow fiber membranes can be removed by the peel-off. Therefore it is preferable that four to six hollow fiber membranes are arranged side by side as one block at comparatively short intervals and that adjacent blocks are spaced at the interval of 2.0 to 10.0 mm to secure the large gas duct.

The suspended component gradually deposits on the upper surface of the rod for folding use with the elapse of time in which the filtration apparatus is used. As a result, both side portions of each hollow fiber membrane spread in a direction in which both side portions thereof move away. Consequently the gaps between both side portions of the hollow fiber membrane and both side portions of the adjacent hollow fiber membrane become short and in some cases, both side portions of the adjacent hollow fiber membranes contact each other. As described above, when the gap between the adjacent hollow fiber membranes becomes slight or is lost, it becomes difficult for water to enter the hollow fiber membrane. Thereby the filtration performance deteriorates.

To overcome the above-described problem, in disposing a plurality of the rods for folding use in parallel with a direction orthogonal to the axial direction of the hollow fiber membranes, the position in vertical axial direction is varied from each other.

In the above-described construction, even though the suspended component deposits on the upper portion of the rod and hence both side portions of the hollow fiber membrane spread, the vertical spread positions of the side portions of the adjacent hollow fiber membranes are different from each other. Therefore it is possible to prevent the gap between the adjacent hollow fiber membranes from being lost or the adjacent hollow fiber membranes from contacting each other.

Further a plurality of U-shaped spread-preventing frame is so provided that each spread-preventing frame is disposed outward from the hollow fiber membrane to surround both side portions of each of the hollow fiber membranes in the range from the bent portions thereof to a position thereof above the rods. By providing the spread-preventing frames, it is possible to prevent both side portions of each of the hollow fiber membranes from spreading, even though the suspended component deposits on the upper surface of the rod.

The rod may be provided with a gas duct vertically penetrating therethrough. By proving the rod with the gas duct, it is possible to suppress and prevent the deposition of the suspended component on the upper surface of the rod.

The gas duct may be formed as one narrow through-hole continuous in the longitudinal direction of the rod or as a plurality of through-holes spaced at predetermined intervals.

Instead of the rod for folding use, the holding member may include a coupling plate disposed in parallel with an axial direction of the hollow fiber membrane and a plurality of cylindrical portions, open at both ends thereof, which project from one surface of the coupling plate in such a way that a pair of the cylindrical portions spaced closely is provided for each of the hollow fiber membranes with adjacent pairs of the cylindrical portions spaced at a predetermined interval; both sides of a bent portion of each of the hollow fiber membranes are inserted through through-holes of a pair of the cylindrical portions respectively with a gap provided between both side portions of the bent portion of each of the hollow fiber membranes; and the bent portion is spanned between a pair of the cylindrical portions to hold the bent portion.

A part of the peripheral surface of each cylindrical portion is fixed to one surface of the coupling plate by a line contact. By setting the height of the cylindrical portion short to such an extent that the cylindrical portion is capable of holding the hollow fiber membrane and setting the inner diameter of the cylindrical portion larger than the outer diameter of the hollow fiber membrane, it is possible to form a gap for the passage of the gas on almost the entire peripheral surface of the hollow fiber membrane inserted through the cylindrical portion.

The above-described construction allows the hollow fiber membranes to be disposed at a high density, prevents the hollow fiber membranes from contacting each other, and the gap to be securely provided between the hollow fiber membranes, thus efficiently removing the suspended component by the peel-off and maintaining the filtration performance to a high extent.

It is possible to construct the holding member of a bendable sheet material and form a large number of both-end open cylindrical portions on one surface of the sheet material with the cylindrical portions spaced at predetermined intervals. With the hollow fiber membrane in penetration through each cylindrical portion, the sheet material may be double folded together with the cylindrical portions.

Further it is possible to fix opposed both side portions of each hollow fiber membrane like the reed screen by using a sheet metal, a tape material or the like with both side portions thereof arranged in parallel and bond the hollow fiber membranes to the coupling plate with an adhesive agent or the like so that the hollow fiber membranes are folded double all together.

As the second invention, there is provided a sucking filtration apparatus of an immersion type or a filtration apparatus of an external pressure type for performing solid-liquid separation by immersing a plurality of hollow fiber membranes in a to-be-treated liquid containing a suspended component so that a treated liquid permeates the hollow fiber membranes, including:

the hollow fiber membranes, one end of each of which is open and other end of each of which is closed;

a treated liquid collection means communicated with an opening at the one end of each of the hollow fiber membranes;

a holding member for holding a closed portion, of each of the hollow fiber membranes, which is disposed at the other end of each of the hollow fiber membranes with a gap formed between the closed portion of each of the hollow fiber membranes and the holding member, and also with a gap formed between the adjacent hollow fiber membranes; and a gas-jetting means, disposed below the holding member, for jetting a gas from a side of the other end of each of the hollow fiber membranes to a side of the one end of each of the hollow fiber membranes, wherein the gas is jetted between the adjacent hollow fiber membranes arranged side by side along an axis of the hollow fiber membranes through the gaps.

In the second invention, the hollow fiber membrane is not folded double unlike the first invention, but the leading end of the hollow fiber membrane at the side opposite to the side where the treated liquid is collected is closed, and the hollow fiber membranes are held by the holding member with the gap provided between the adjacent hollow fiber membranes.

In the above-described construction, it is possible to efficiently impart the gas jetted by the gas-jetting means to the membrane surface of each hollow fiber membrane and obtain the effect of removing the suspended component by the peel-off, similarly to the first invention.

The configuration of the holding member of the second invention is not limited to a specific configuration. For example, it is possible to compose the holding member of a fixing plate disposed in parallel with the axial direction of the hollow fiber membranes and fix a part of a peripheral surface of each of the hollow fiber membranes to one surface of the fixing plate.

The hollow fiber membrane may be fastened to the fixing plate by adherence or by sandwiching the peripheral surface of each hollow fiber membrane between two opposed sandwiching plates.

It is preferable that as the gas-jetting means for jetting the gas for cleaning use, one pressurized gas supply pipe is disposed below the holding member and that one or a plurality of gas-jetting holes are formed in the pressurized gas supply pipe.

The gas-jetting hole may be formed at any desired portions of the peripheral surface of the pressurized gas supply pipe. But to prevent the suspended component which has peeled off the hollow fiber membrane from entering the gas-jetting hole at a time when the gas is supplied intermittently and when the filtration apparatus is not operated, it is preferable to form the gas-jetting hole at a lower portion of the pressurized gas supply pipe, namely, a side opposite to the side at which the hollow fiber membrane is tensionally mounted.

The filtration apparatus includes a hollow fiber membrane module having a plurality of hollow fiber membranes arranged side by side. One open end of each of a plurality of the hollow fiber membranes of the hollow fiber membrane module is fixed to a fixing member by adhesion; the treated liquid collection means consisting of a water-collecting header is mounted on the fixing member; the water-collecting header is connected to a water-collecting pipe; and a liquid which has undergone filtration treatment is sucked to the water-collecting pipe. The other side of each of a plurality of the hollow fiber membranes of the hollow fiber membrane module is held by the holding member.

It is preferable that one gas-jetting hole is formed per the hollow fiber membrane module through the pressurized gas supply pipe at certain intervals. A plurality of the gas-jetting holes may be disposed for one hollow fiber membrane module. But as the number of the gas-jetting holes becomes large, air is increasingly jetted for the amount of the membrane, namely, for the amount of the liquid to be treated. Thus there is an increase in the running cost, which is not preferable.

In the filtration apparatus of the present invention, by providing the filtration apparatus with the holding member, the air can be efficiently supplied to the surface of the hollow fiber membrane. Therefore even though the number of the gas-jetting holes is small, it is possible to obtain the effect of sufficiently removing the suspended component by the peel-off. It is preferable to set the outer diameter of the gas-jetting hole to 4 mm to 8 mm.

The above-described pressurized gas supply pipe is coupled to an air supply source such as a blower or a compressor through an air-introducing header with which an end portion of the pressurized gas supply pipe is removably connected in an airtight state.

In the above-described construction, even though the gas-jetting hole of the pressurized gas supply pipe is closed while filtration treatment is being performed, it is possible to clean the suspended component clogged on the pressurized gas supply pipe by pulling out the pressurized gas supply pipe from the air-introducing header. By mounting the pressurized gas supply pipe on the air-introducing header after the cleaning finishes, the function of the pressurized gas supply pipe can be recovered easily.

When one holding member is provided for one hollow fiber membrane module, it is preferable that a skirting part is projected toward the air-jetting means along the periphery of the holding member to prevent the jetted gas from escaping from a region surround with the skirting part.

By providing the skirting part, the pressurized jetted gas is held inside the skirting part without the gas escaping therefrom. Therefore the jetted air can be utilized effectively without loss. A air reservoir is formed entirely below the holding member. Air whose pressure has become uniform inside the air reservoir is supplied to the surface of the hollow fiber membrane through the through-hole. Therefore the air can be jetted uniformly to the surface of the hollow fiber membrane of the hollow fiber membrane module.

Thereby even though the number of air-jetting holes is set small per the hollow fiber membrane module, it is possible to obtain the effect of sufficiently removing the suspended component by the peel-off. Therefore a supply amount of air is small and thus the running cost can be decreased.

The configuration of the skirting part is not specifically limited, provided that it is projected in the direction of the gas-jetting means along the periphery of the holding member.

It is preferable to form an air-distributing plate having one or a plurality of air-diffusing holes formed therethrough with the air-distributing plate partitioning an inside of the skirting part.

The air-distributing plate is effective because it is capable uniformly dispersing the air and uniformly imparting the air to the surface of the hollow fiber membrane.

It is preferable that in the hollow fiber membrane module, a plurality of the hollow fiber membranes is collectively disposed circularly or rectangularly in a horizontal section with a predetermined gap formed between the adjacent hollow fiber membranes and that the interval between the adjacent hollow fiber membranes is set to 2 to 6 mm.

It is preferable that the hollow fiber membranes are disposed by setting an axial direction thereof as a vertical direction, with the open end of each of the hollow fiber membranes disposed at an upper side thereof and with other end of each of the hollow fiber membranes supported by the holding member disposed at a lower side thereof and that the gas-jetting means is disposed below the holding member.

Both ends of each of a plurality of hollow fiber membranes of the hollow fiber membrane module may be connected with each other with a rigid coupling-supporting member.

A porous pipe may be used as the coupling-supporting member and as a second pressurized gas supply pipe for jetting the pressurized gas.

By coupling both ends of the hollow fiber membrane module to the rigid coupling-supporting member and specifying the dimension between the fixing member and the holding member, a plurality of the hollow fiber membranes mounted between the fixing member and the holding member can be held linearly without the hollow fiber membranes being flexed, even though vibration generated by the jetting of the pressurized gas is imparted to the hollow fiber membranes.

To this end, each hollow fiber membrane is required to have a high tensile strength. In this respect, as described later, by composing the hollow fiber membrane such as PTFE of a material having a high tensile strength, the pressurized air can be jetted directly to the gap between the hollow fiber membranes.

By forming the coupling-supporting member of the porous pipe and jetting the pressurized gas to the hollow fiber membranes from the hole formed on the porous pipe in its axial direction, it is possible to uniformly supply the air to the entire region of the hollow fiber membranes in the axial direction thereof and restrain the suspended component from attaching to and depositing on the surface of the hollow fiber membrane.

It is preferable that one or not less than two combined protection members are mounted on a portion of the hollow fiber membrane where the hollow fiber membrane contacts the holding member.

As the protection member, a tube, a tape, and a film made of various plastic materials can be used. It is favorable to use a heat-shrinkable polyethylene tube because it can be easily processed. It is more favorable that the protection member is made of a porous plastic material, because the protection member does not deteriorate the filtration function of a protection member-mounted portion of the hollow fiber membrane. In addition, it is possible to apply a polymeric material such as liquid silicone rubber or fluororubber to the surface of a tubular membrane or immerse the tubular membrane in the polymeric material and thereafter harden the polymeric material to use it as a coating material. In addition, ABS resin may be dissolved or dispersed in a solvent such as MEK. After the mixture is applied to the polymeric material, the solvent is removed to use ABS resin as a coating material.

It is preferable that the hollow fiber membrane consists of fluororesin containing a porous material made of PTFE (polytetrafluoroethylene). The hollow fiber membrane may be made of fluororesin containing a porous material such as PVDF (polyvinylidene fluoride). It is especially favorable that the hollow fiber membrane is constructed of expanded PTFE. By composing the hollow fiber membrane of the expanded PTFE, the hollow fiber membrane is stable for acid, alkali, and solvent. Further because the PTFE has excellent unadhesiveness, the suspended component little attaches to the hollow fiber membrane made of the PTFE and the PTFE has high flexibility, the PTFE is suitable for being processed into a double folded configuration.

The tensile strength of the hollow fiber membrane is set to not less than 30N. By imparting a high tensile strength thereto, the hollow fiber membrane sufficiently withstands the flow of the pressurized air generated by bubbling and strong vibrations generated by the flow of the to-be-treated liquid caused by the flow of the pressurized air. Thereby the hollow fiber membrane is not flexed or damaged. To allow the hollow fiber membrane to have the above-described properties, the PTFE membrane is desirable.

The material of the hollow fiber membrane is not limited to the above-described materials, but it is possible to use polysulfone resin; polyacrylonitrile; cellulose derivatives; polyolefin such as polyethylene, polypropylene, and the like; polyvinyl alcohol resin; polyamide; polyester; polymethacrylate; polyacrylate; porous alumina; and ceramic such as porous silicon nitride and the like. In addition, the hollow fiber membrane may be made of copolymers of the above-described resins and the copolymers containing substituting groups introduced thereinto; and mixtures of two or more kinds of the above-described resins. Further the hollow fiber membrane may be made of various kinds of composites such as a polymer-fixed composite, a substituting group-introduced composite, a plated composite.

It is preferable that the hollow fiber membrane has an inner diameter of 0.3 to 12 mm, an outer diameter of 0.8 to 14 mm, an ultra-fine pore size of 10 nm to 1000 nm, a membrane thickness of 0.2 to 1 mm, a porosity of 50 to 90%, and a pressure resistance of 0.1 to 1.0 MPa in a transmembrane pressure difference.

The above-described hollow fiber membrane is applicable to filtration of the to-be-treated liquid containing various suspended component.

Effect of the Invention

As described above, according to the filtration apparatus of the present invention, the other ends of a plurality of the hollow fiber membranes disposed at the side of the pressurized gas jetting means are supported by the holding member with the gaps formed between the other ends of the hollow fiber membranes and the holding member. Therefore the holding member supports the hollow fiber membranes and at the same time allows the gas passing through the gaps between the hollow fiber membranes and the holding member to be imparted to the membrane surfaces of the hollow fiber membranes. Thus it is possible to reliably vibrate the membrane surfaces and efficiently and reliably remove the suspended component which has deposited on the membrane surfaces or in the gaps between the membranes by the peel-off owing to the liquid flowing along the surfaces of the hollow fiber membranes. Further because it is possible to apply bubbles sufficiently to the entire hollow fiber membrane module in which the hollow fiber membranes are collectively set, it is possible to prevent the solid content from depositing on the lower portion of the hollow fiber membrane module and secure a stable filtration function.

Further by holding the bent portions of the hollow fiber membranes by the holding member with the gaps formed between the bent portions of the hollow fiber membranes and the holding member, bubbles are sufficiently applied to the lowermost portion of each of the hollow fiber membranes. Thus it is possible to prevent the deposition of the solid content. Therefore the effective area of the membrane little decreases and thus the filtration function hardly deteriorates. Thereby water can be treated in a stable amount. Further by folding the hollow fiber membrane double, it is possible to secure a larger membrane surface area than a type of the hollow fiber membrane, both ends of which are closed. Therefore the filtration apparatus is capable of treating a large amount of water.

BRIEF DESCRIPTION OF THE DRAWINGS

FIG. 16 shows a second modification of the fourth embodiment, in which (A) is a schematic front view; (B) is a plan view of a rod; and (C) is a plan view of the a modified rod.

FIG. 17 is a schematic front view showing a third modification of the fourth embodiment.

FIG. 24 shows a filtration apparatus of a comparison example 1, in which (A) shows a method of diffusing air for a hollow fiber membrane module; (B) shows a method of holding a lower end of a hollow fiber membrane of the hollow fiber membrane module; and (C) shows the position of an air-diffusing pipe.

EXPLANATION OF REFERENCE NUMERALS AND SYMBOLS

Figure 1:
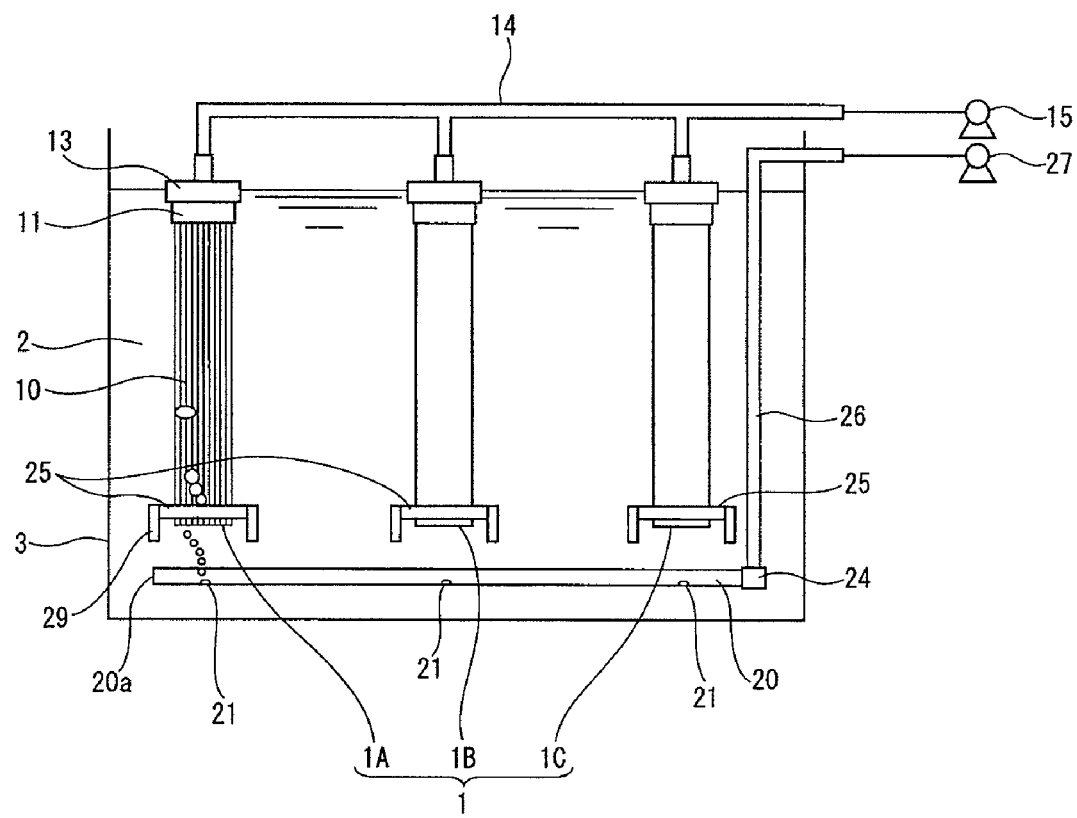
FIG. 1 is a schematic entire view showing a filtration apparatus of a first embodiment of the present invention.

1: hollow fiber membrane module
2: to-be-treated liquid
3: immersion tank
10: hollow fiber membrane 11: fixing member
13: water-collecting header
14: water-collecting pipe
20: cleaning pipe
21: gas-jetting hole
25: holding member
27: blower
28: through-hole
29: skirting part
30: air-diffusing plate
35: protection sheet
40: coupling plate
41: cylindrical portion
45: sheet material
47: fixing plate
48: tape member
70: rod for folding use

BEST MODE FOR CARRYING OUT THE INVENTION

The embodiments of the present invention are described below with reference to the drawings.

FIGS. 1 through 7 show the first embodiment in which the present invention is applied to a sucking filtration apparatus of immersion type.

As shown in FIG. 1, in the filtration apparatus of the first embodiment, a plurality of hollow fiber membrane modules 1 (1A, 1B, 1C) is hung inside an immersion tank 3 containing a to-be-treated liquid 2 to immerse the hollow fiber membrane modules 1 in the to-be-treated liquid 2. In the first embodiment, filtration treatment is performed by immersing the hollow fiber membrane modules 1 in an active sludge tank containing sewage to be treated and carrying out a membrane separation active sludge method. Although three hollow fiber membrane modules are briefly shown in FIG. 1, the number of the hollow fiber membrane modules 1 is not limited to three but a plurality of the hollow fiber membrane modules 1 is used.

The above-described three hollow fiber membrane modules 1 (1A, 1B, 1C) are coupled to a water-collecting pipe 14 with the hollow fiber membrane modules 1 arranged in parallel at predetermined intervals.

Figure 2:
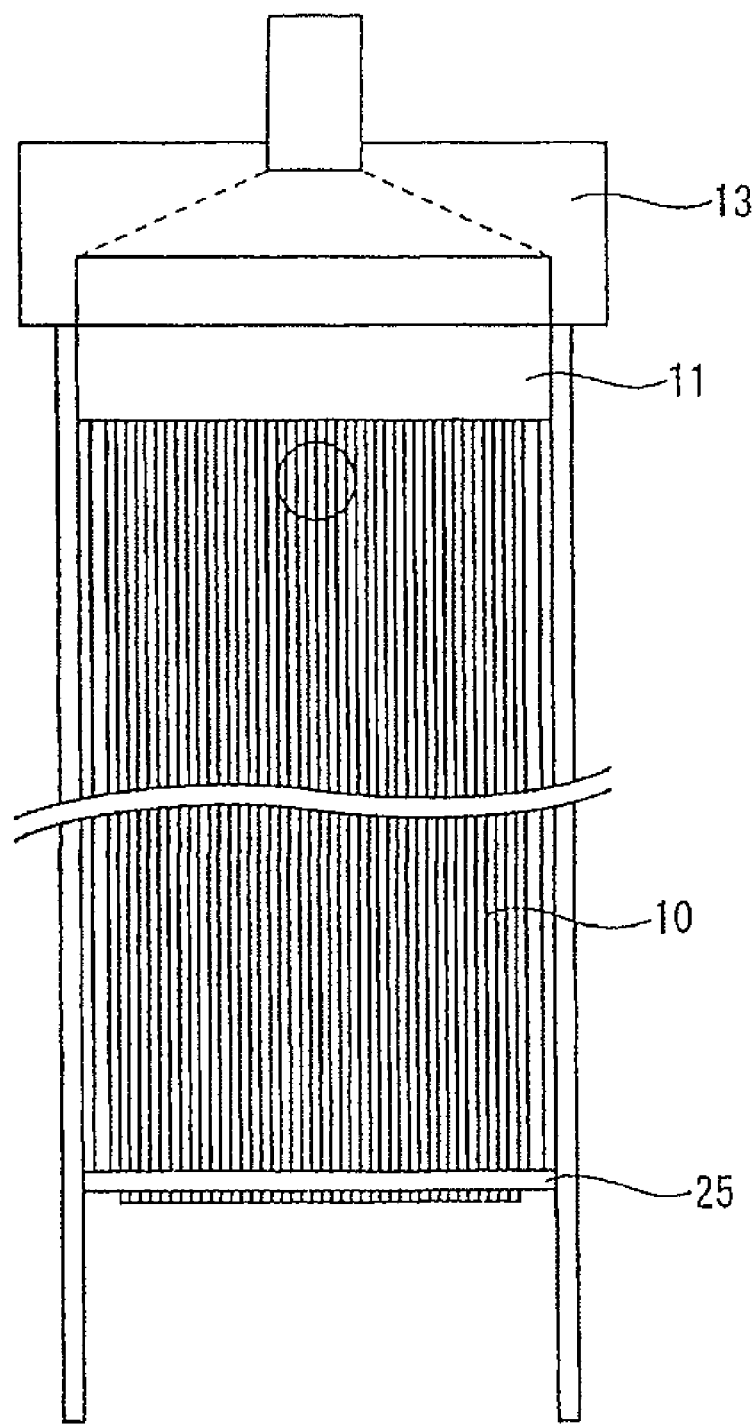
FIG. 2 is a front view of a hollow fiber membrane module of the first embodiment.

As shown in FIGS. 2 and 3, each of the hollow fiber membrane modules 1 has a large number of hollow fiber membranes (945 hollow fiber membranes in the first embodiment) 10 each double folded. With a U-shaped bent portion of each hollow fiber membrane 10 disposed at other side of the hollow fiber membrane module 1, an open upper-end side of the hollow fiber membrane 10 is fixed in position with resin with both open upper ends of the hollow fiber membrane 10 disposed adjacently to each other to form a fixing member 11. The fixing member 11 is formed by hardening a liquid resin such as epoxy resin, unsaturated polyester resin, polyurethane resin or the like or by forming holes each having a size equal to that of the hollow fiber membrane in a hot-melt plastic material such as PFA, PP, PE resin, accommodating the hollow fiber membranes in the holes respectively, and melting the hot-melt plastic material. With the hollow fiber membranes 10 held by the fixing member 11, openings 10d, 10e disposed at both ends of each hollow fiber membrane 10 are communicated with the inside of a water-collecting header 13, and the water-collecting header 13 is communicated with the water-collecting pipe 14.

Figure 3A:
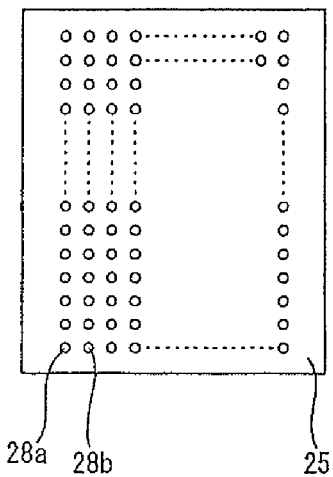
FIG. 3A is a plan view of a holding member of the hollow fiber membrane module of the first embodiment.
Figure 3B:
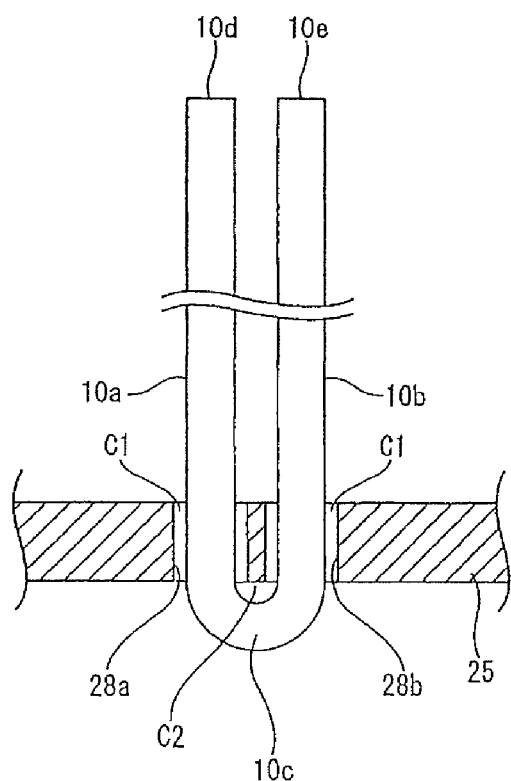
FIG. 3B shows a state in which a hollow fiber membrane is inserted through the holding member.

The bent portion at the lower end of each hollow fiber membrane 10 is inserted through a through-hole 28 formed in penetration through a holding member 25 consisting of a rectangular flat plate shown in FIG. 3(A). One holding member 25 is provided for every hollow fiber membrane module 1. The through-holes 28 of the holding member 25 are formed at regular intervals in X and Y directions. As shown in FIG. 3(B), both double folded side portions 10a, 10b of one of the hollow fiber membranes 10 are inserted through a pair of adjacent through-holes 28a, 28b respectively. A lower-end bent portion 10c of the hollow fiber membrane 10 disposed between both side portions 10a and 10b thereof spans the holding member 25 between the through-holes 28a, 28b with the lower-end bent portion 10c located below the holding member 25. More specifically, after one hollow fiber membrane 10 is downward inserted through one through-hole 28a, the hollow fiber membrane 10 is folded, and thereafter upward inserted through the other through-hole 28b. Thereafter the holding member 25 is disposed at a position close to the bent portion 10c with the openings 10d, 10e of the hollow fiber membrane 10 at both ends thereof arranged side by side at the upper end thereof.

Figure 3C:
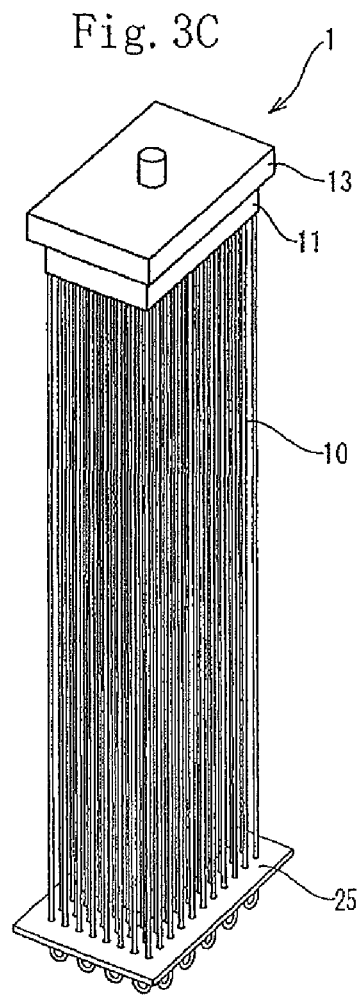
FIG. 3C is a perspective view showing a state in which the holding member is mounted on the hollow fiber membrane.

As described above, by fixing the upper ends of a plurality of the hollow fiber membranes 10 to the fixing member 11 and the water-collecting header 13 and supporting the lower ends of the hollow fiber membranes 10 by the holding member 25, the hollow fiber membrane module 1 as shown in FIG. 3(C) is formed.

The diameter of each through-hole 28 of the holding member 25 is set larger than an outer diameter of the hollow fiber membrane 10 to freely insert the hollow fiber membrane 10 through the through-hole 28. A gap C1 for gas circulation is formed between the periphery of the hollow fiber membrane 10 and the inner peripheral surface of the through-hole 28. In the first embodiment, the diameter of the through-hole 28 is set to 3.8 mm. The outer diameter of the hollow fiber membrane 10 is set to 2.3 mm. Thus even though the peripheral surface of the hollow fiber membrane 10 contacts a part of the inner peripheral surface of the through-hole 28, the gap C1 is present between most of the peripheral surface of the hollow fiber membrane 10 and the inner peripheral surface of the through-hole 28.

The lower-end bent portion 10c of the hollow fiber membrane 10 and the lower surface of the holding member 25 do not contact each other, but a gap C2 is formed therebetween.

The holding member 25 is made of resin, a steel plate or the like. The kind of the material of the holding member 25 is not limited to a specific kind. In the first embodiment, the holding member 25 is made of PVC resin excellent in resistance to chemicals.

The hollow fiber membrane 10 is made of a porous material consisting of PTFE (polytetrafluoroethylene). Because the porous material consisting of the PTFE is flexible and has a high strength, the hollow fiber membrane 10 is not damaged, when it is inserted through the through-hole 28 of the holding member 25 and folded double.

In detail, the hollow fiber membrane 10 used in the first embodiment has an inner diameter of 0.3 to 12 mm, an outer diameter of 0.8 to 14 mm, a film thickness of 0.2 to 11.0 mm, an effective length of 200 to 3000 mm, a diameter of 10 nm to 1000 nm in an ultra-fine pore thereof, a porosity of 50 to 80%, a tensile strength not less than 30N, and a pressure resistance of 0.1 to 1.0 MPa as a transmembrane pressure difference.

To penetrate the hollow fiber membrane 10 through the through-holes 28, having a diameter of 3.8 mm, which is formed through the holding member 25, the hollow fiber membrane 10 used in the first embodiment is made of stretched PTFE, has an inner diameter of 1.1 mm, an outer diameter of 2.3 mm, and an effective length of 1530 mm. The diameter of ultra-fine pores is 450 nm, and the porosity was 75%.

Figure 4:
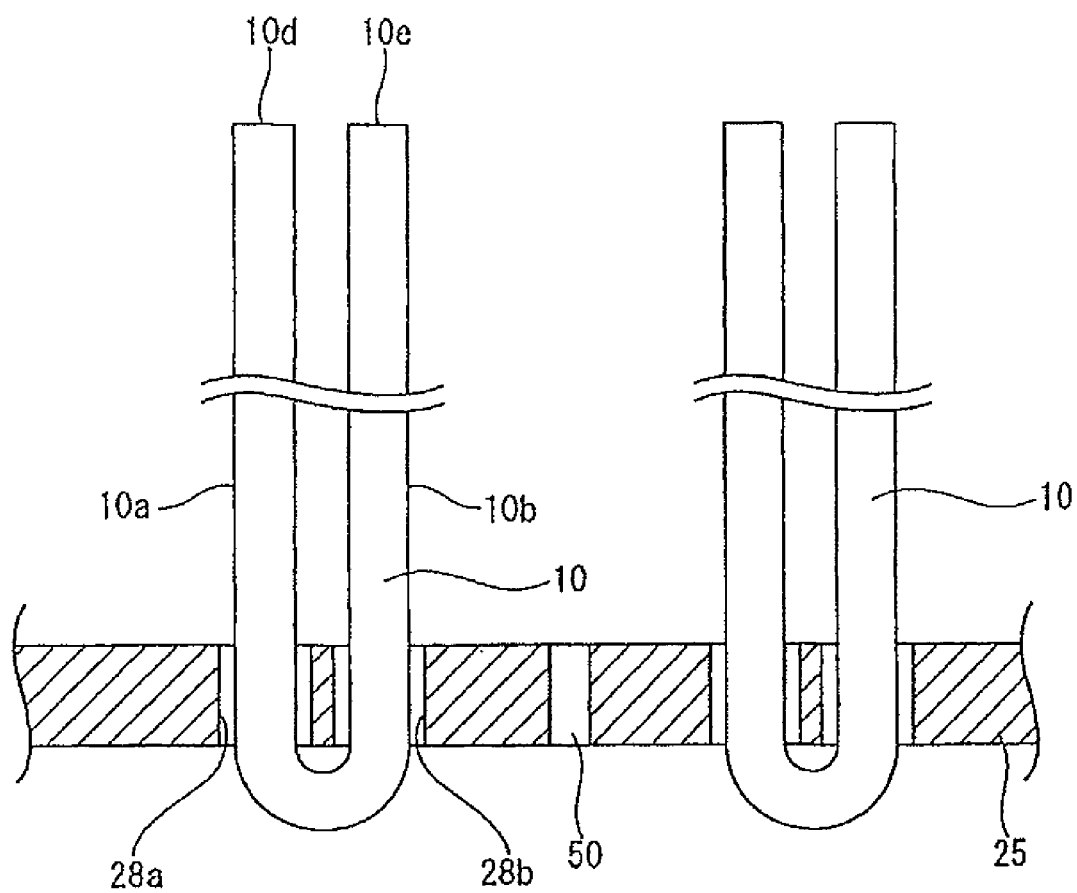
FIG. 4 shows the state in which the hollow fiber membrane is inserted through the holding member of the hollow fiber membrane module of the first embodiment and a dummy hole.

As shown in FIG. 4, the through-holes 28 are formed through the holding member 25 not at regular intervals, but a pair of the through-holes 28a and 28b through which both side portions 10a and 10b of the hollow fiber membrane 10 are inserted respectively are spaced at a comparatively short interval, whereas a pair of the through-holes 28 and an adjacent pair of the through-holes are spaced at a comparatively long interval. A dummy hole 50 through which the hollow fiber membrane is not inserted is formed in penetration through the holding member 25 to allow a gas and the to-be-treated liquid 2 to permeate therethrough.

To prevent the hollow fiber membrane 10 from being damaged owing to contact between the hollow fiber membrane 10 and the holding member 25, one heat-shrinkable polyethylene tube may be mounted on the hollow fiber membrane 10 at a position where the hollow fiber membrane 10 is capable of contacting the holding member 25.

As described above, the upper end of each of the hollow fiber membranes 10 of each of the hollow fiber membrane modules 1A, 1B, and 1C is fixed to the fixing member 11. The water-collecting header 13 is liquid-tightly fixed to an upper portion of the fixing member 11. With the hollow fiber membrane 10 facing the water-collecting header 13 and with the upper-end opening of each of the hollow fiber membranes 10 kept open, a treated liquid inside the hollow fiber membrane 10 is collected by the water-collecting header 13.

The water-collecting header 13 of each of the hollow fiber membrane modules 1A, 1B, and 1C is removably coupled to the water-collecting pipe 14 so that a treated liquid is sucked by a sucking pipe 15. In the first embodiment, because the hollow fiber membrane 10 is U-shaped, the treated liquid is sucked upward.

The water-collecting header 13 is formed by molding a material having a high mechanical strength and durability. For example, polycarbonate, polysulfone, polyolefin, polyvinyl chloride, acrylic resin, ABS resin, modified PPE resin, and fluororesin (PTFE, PFA, FEP, and PVDF) are used.

Figure 5:
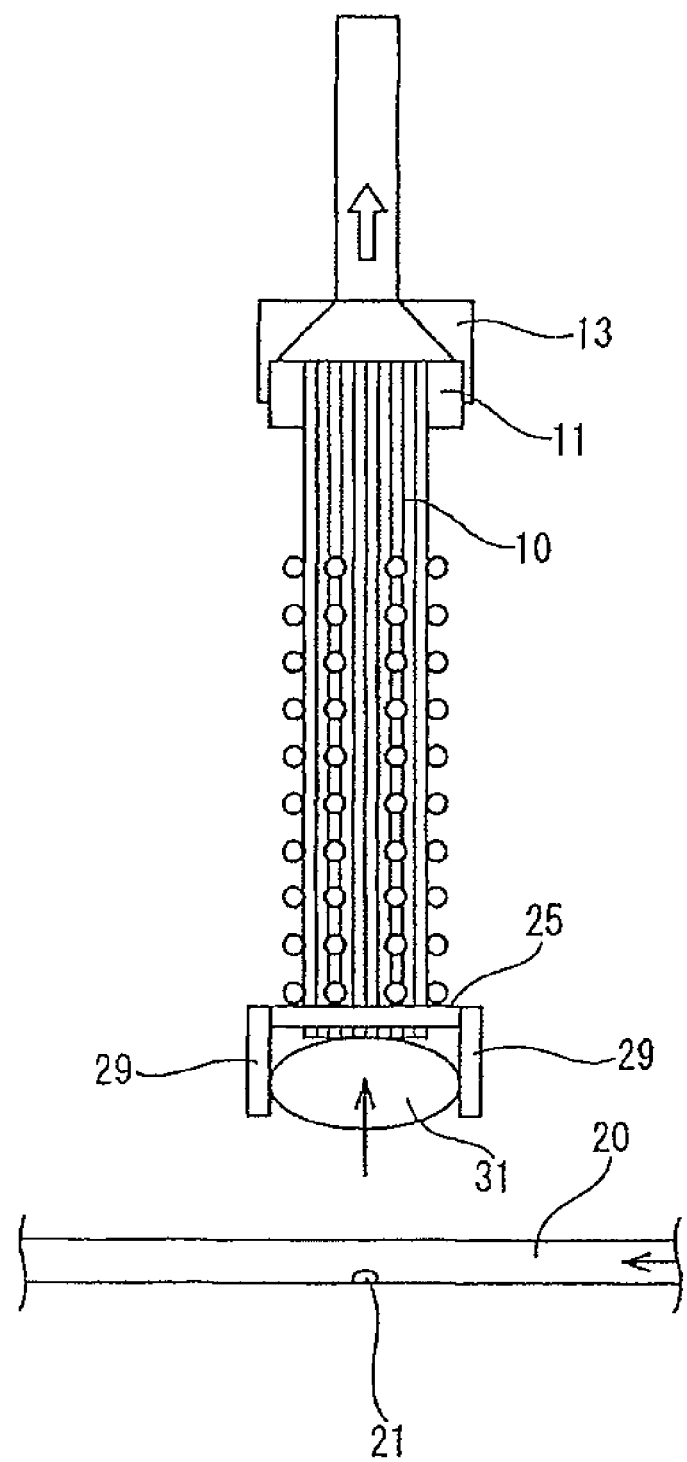
FIG. 5 shows a gas-jetting means of the filtration apparatus of the first embodiment.

As shown in FIGS. 1 and 5, below the holding member 25 disposed in the vicinity of the lower-end bent portion 10c of the hollow fiber membrane 10, one cleaning pipe 20 is horizontally disposed as a pressurized gas jetting means at an interval of 100 to 500 mm from the holding member 25.

As shown in FIG. 1, the cleaning pipe 20 is long and traverses the three hollow fiber membrane modules 1A, 1B, and 1C arranged side by side at certain intervals.

One air-jetting hole 21 is formed on the cleaning pipe 20 at a position corresponding to the center of each of the hollow fiber membrane modules 1 (1A, 1B, and 1C). The air-jetting hole 21 is formed at the lower side of the cleaning pipe 20 to prevent the air-jetting hole 21 from being clogged with a suspended component which has separated and dropped from the surfaces of the hollow fiber membranes 10. It is preferable to set the inner diameter of the air-jetting hole 21 to 4 mm to 8 mm. In the first embodiment, the inner diameter of the air-jetting hole 21 is set to 5 mm. Polyvinyl chloride is molded into the cleaning pipe 20. The inner diameter and outer diameter of the cleaning pipe 20 are set to 13 mm and 18 mm respectively.

One end of the cleaning pipe 20 may be formed as a closed end 20a, as shown in FIG. 1. Alternatively the cleaning pipe 20 may be so constructed that air can be introduced into the hollow fiber membrane modules arranged side by side from both sides thereof. When the one end of the cleaning pipe 20 is formed as the closed end, the other end of the cleaning pipe 20 is removably coupled to an air-introducing header 24 through a packing (not shown) to keep the other end of the cleaning pipe 20 airtight. The air-introducing header 24 is connected with a blower 27 through an air-introducing pipe 26 to introduce pressurized air having 20 to 50 kPa into the air-introducing header 24.

As shown in FIG. 5, in each hollow fiber membrane module 1, a skirting part 29 is projected downward along the periphery of the holding member 25. The air-jetting hole 21 of the cleaning pipe 20 is disposed below the center of the skirting part 29. The skirting part 29 is formed to collect a gas jetted from the cleaning pipe 20 inside the skirting part 29 and prevent the gas from escaping therefrom.

Figure 6:
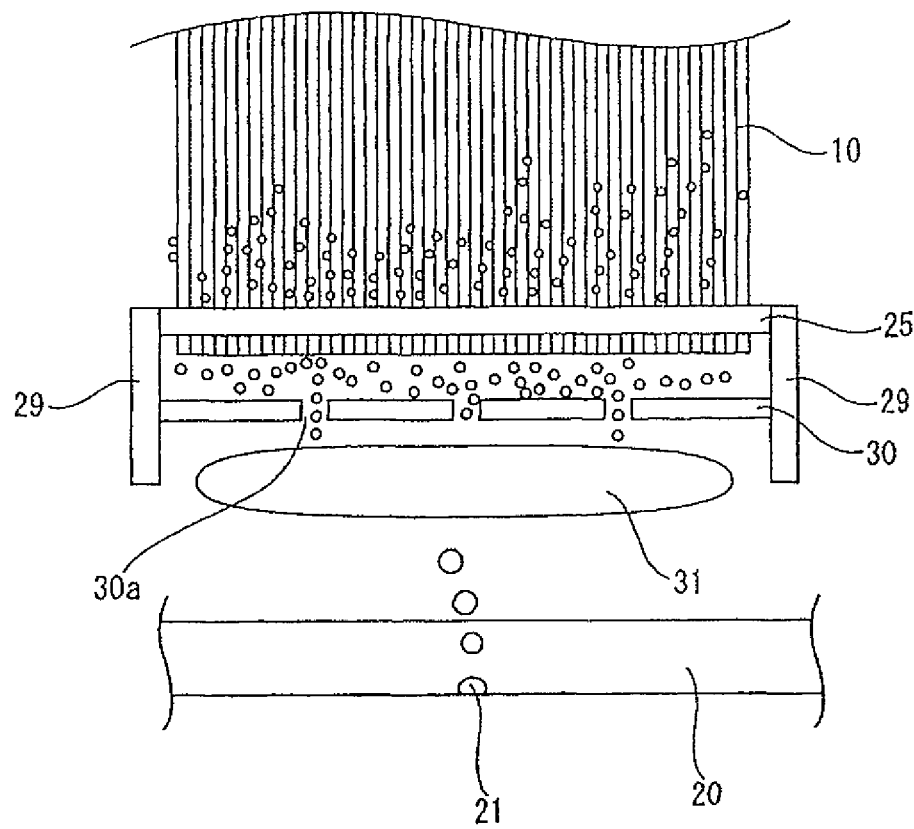
FIG. 6 is an explanatory view for explaining the use state of the gas-jetting means, a skirting part, and an air-diffusing plate of the filtration apparatus of the first embodiment.

As shown in FIG. 6, it is preferable to form an air-diffusing plate 30, inside the skirting part 29, through which one or a plurality of air-diffusing holes 30a for uniformly dispersing air is formed.

The operation of the filtration apparatus 10 of the first embodiment is described below.

By driving the sucking pump 15, the to-be-treated liquid 2 introduced into the immersion tank 3 and filled therein permeates the hollow fiber membranes 10 of each of the hollow fiber membrane modules (1A, 1B, and 1C) to perform solid-liquid separation. Thereafter the treated liquid is collected through the water-collecting pipe 14.

To reliably continue the filtration treatment, the suspended component which has deposited on the surfaces of the hollow fiber membranes 10 or between membranes is removed by peel-off. At that time, the blower 27 is operated to introduce the pressurized air into the cleaning pipe 20 from the air-introducing pipe 26 and the air-introducing header 24. The pressurized air is jetted from the air-jetting hole 21 of the cleaning pipe 20. The jetted pressurized air is collected in a region disposed below each hollow fiber membrane module 1 by the skirting part 29, jetted above the holding member 25 through the gap C1 between the inner peripheral surface of the through-hole 28 of the holding member 25 and the peripheral surface of the hollow fiber membrane 10, and rises in an axial direction of the hollow fiber membranes 10 through the gap between the adjacent hollow fiber membranes 10, with the jetted pressurized air in contact with the surfaces of the hollow fiber membranes 10. Thereby the suspended component which has attached to and deposited on the surface of the hollow fiber membrane 10 is strongly removed by the peel-off.

The suspended component may be removed by the peel-off continually or periodically by jetting the pressurized air.

When the air-diffusing plate 30 is so provided that the air-diffusing plate 30 partitions the skirting part 29, as shown in FIG. 6, the gas which has flowed into the skirting part 29 forms an air reservoir 31 below the air-diffusing plate 30, is thereafter uniformly dispersed through the air-diffusing hole 30a, and spreads all over the region below the holding member 25, thus being blown out from the gap C1 disposed between the inner peripheral surface of the through-hole 28 and the peripheral surface of the hollow fiber membrane 10. Therefore it is possible to accomplish the peel-off removal of the suspended component uniformly and efficiently.

As described above, according to the first embodiment of the present invention, each of the hollow fiber membranes 10 is folded double and inserted through the through-hole 28 of the holding member 25 to hold the hollow fiber membrane 10 at the lower-end folded portion 10c with the gap C1 formed in penetration through the holding member 25. Thus it is possible to reliably impart the bubbled gas to the peripheral surface of each hollow fiber membrane 10 through the gap C1 and vibrate the hollow fiber membrane 10. Thereby it is possible to accomplish the peel-off removal of the suspended component and at the same time hold the lower side of the hollow fiber membrane 10 in position. Therefore the hollow fiber membrane 10 can be cleaned reliably by a simple construction.

In the first embodiment, because one hollow fiber membrane 10 is inserted through one through-hole 28 of the holding member 25, it is possible to secure the gap C1 having a large space around the periphery of the hollow fiber membrane 10 and form the interval between the adjacent hollow fiber membranes 10. Therefore the air can be effectively imparted to the surface of the hollow fiber membrane 10.

Figure 7:
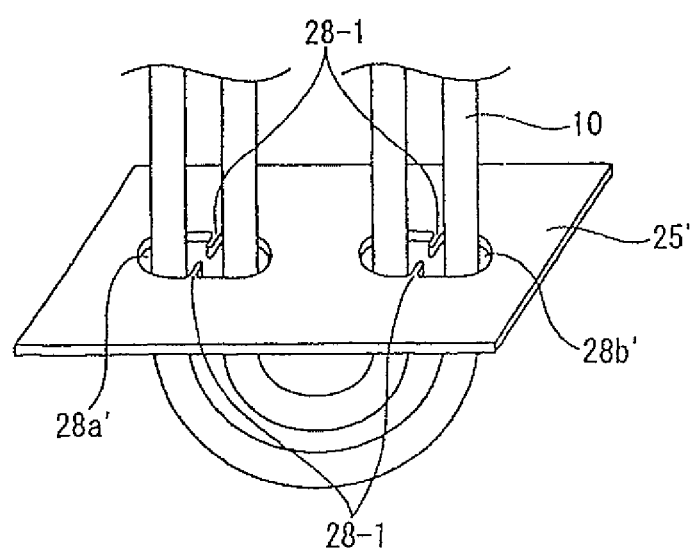
FIG. 7 shows a state in which two hollow fiber membranes are inserted through through-holes of the holding member of the hollow fiber membrane module of the first embodiment.

In the first embodiment, one hollow fiber membrane 10 is inserted through one through-hole 28 of the holding member 25. Instead the through-hole 28 may be oblong and two or three hollow fiber membranes 10 may be inserted through one through-hole 28. In this case, as shown in FIG. 7, it is preferable to hold the hollow fiber membranes 10 by forming ribs 28-1 on the peripheral edge of the oblong through-hole 28' with the ribs 28-1 confronting each other and by placing the hollow fiber membranes 10 in position at a certain interval.

Figure 8A:
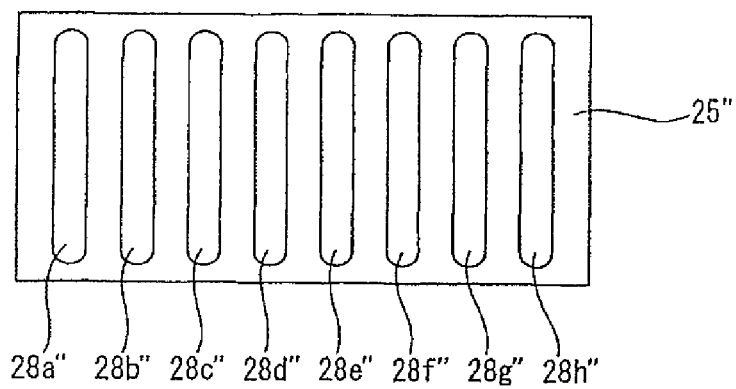
FIG. 8(A) is a plan view of a holding member of a hollow fiber membrane module of a second embodiment.
Figure 8B:
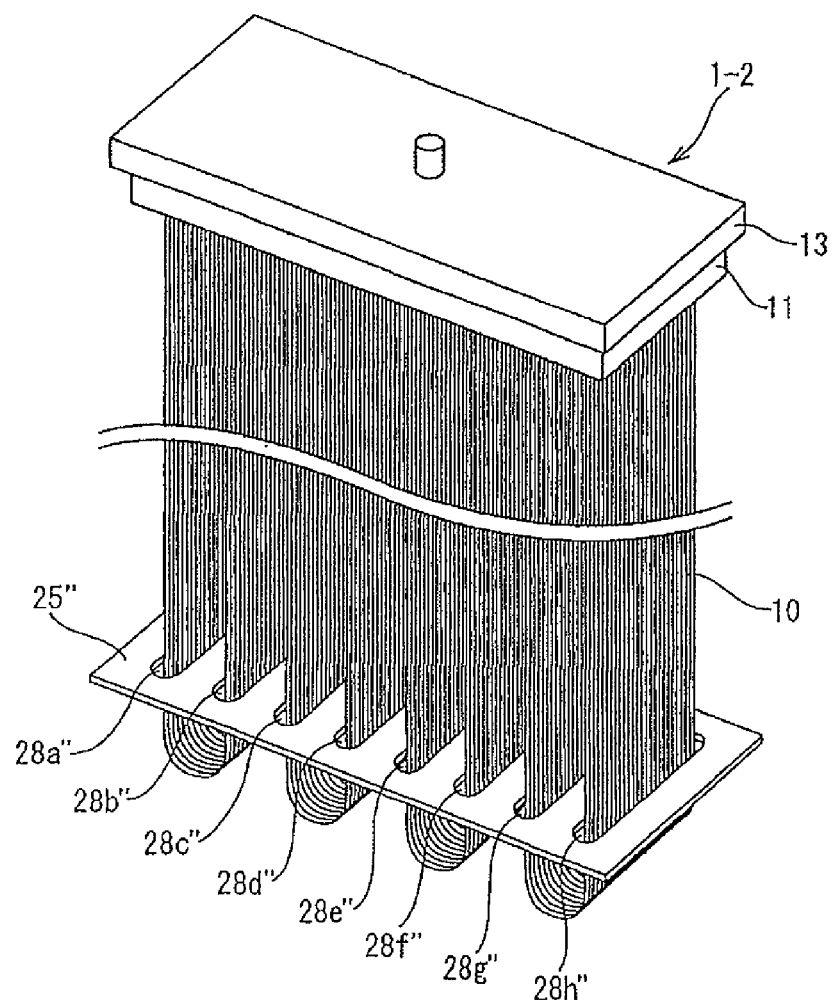
FIG. 8(B) is a perspective view showing a state in which the holding member is mounted on hollow fiber membranes.

FIGS. 8(A), 8(B) show a hollow fiber membrane module 1-2 for use in a filtration apparatus of the second embodiment of the present invention.

As shown in FIG. 8(A), a plurality of pairs of oblong through-holes 28 is formed through a holding member 25" of the second embodiment, with a plurality of pairs of the through-holes 28 in parallel with one another. As shown in FIG. 8(B), after the hollow fiber membranes 10 arranged in line like a reed screen are inserted collectively through one through-hole 28a", they are bent. Thereafter the hollow fiber membranes 10 are inserted collectively through the other through-hole 28b" by folding them double. One hollow fiber membrane module has a plurality of pairs of the hollow fiber membranes.

The construction of the second embodiment enhances the operability of mounting the hollow fiber membranes 10 on the holding member 25".

Figure 9A:
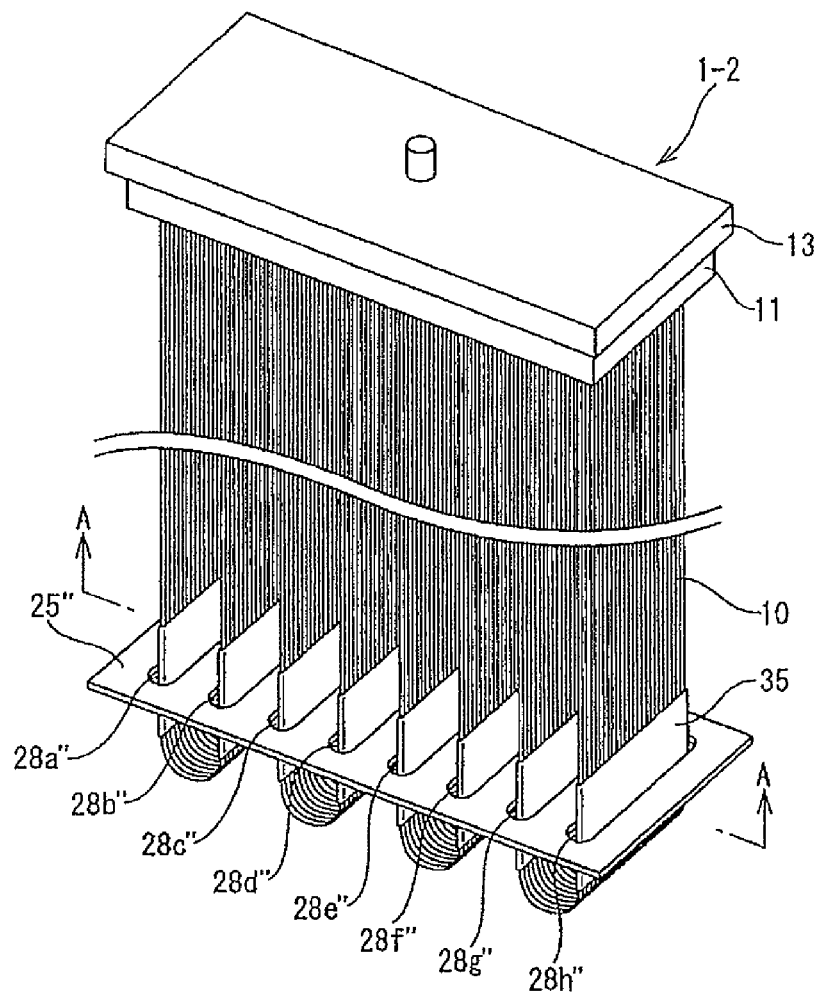
FIG. 9 shows a first modification of the second embodiment, in which (A) shows a state in which a protection sheet is mounted on hollow fiber membranes; and (B) is a sectional view taken along a line A-A showing main parts of (A).
Figure 9B:
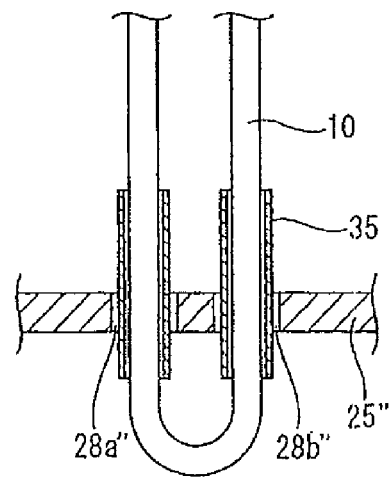

FIGS. 9(A), 9(B) show a first modification of the second embodiment. As shown in FIG. 9(A), a protection sheet 35 is bonded to a portion, of each of the hollow fiber membranes 10, which contacts the holding member 25" to prevent the hollow fiber membranes 10 from being damaged. The protection sheet 35 is made of a porous material such as PTFE to prevent the protection sheet 35 from inhibiting filtration treatment.

As shown in FIG. 9(B), the protection sheet 35 is mounted on the hollow fiber membranes 10 arranged in line like the reed screen with the hollow fiber membranes 10 sandwiched between the protection sheets 35 to prevent both sides of the bent portion of each of the hollow fiber membranes 10 from directly contacting the inner peripheral surface of each of the through-holes 28a", 28b".

Figure 10A:
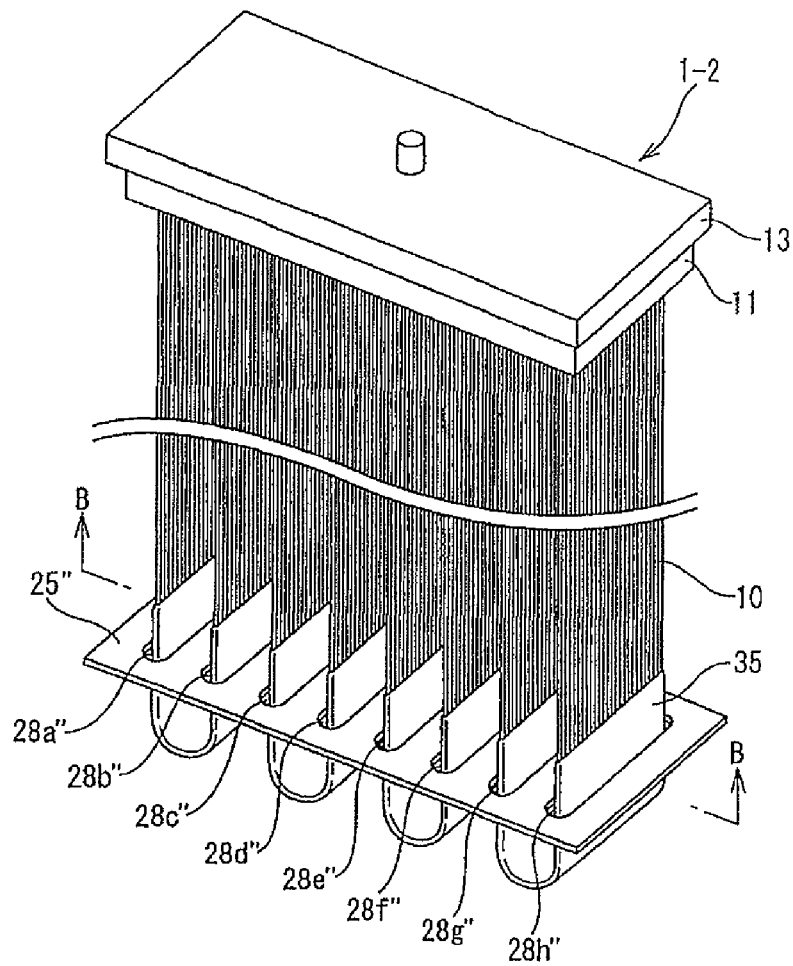
FIG. 10 shows a second modification of the second embodiment, in which (A) shows a state in which a protection sheet is mounted on hollow fiber membranes; and (B) is a sectional view taken along a line B-B showing main parts of (A).
Figure 10B:
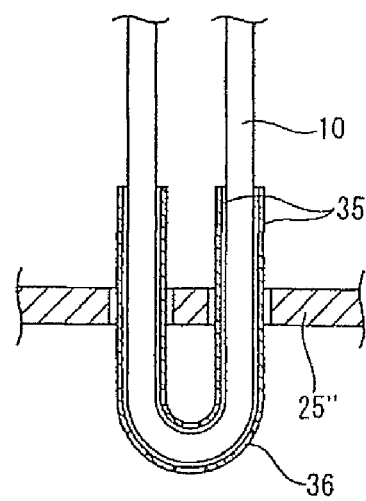

FIGS. 10(A), 10(B) show a second modification of the second embodiment.

In the second modification, a pair of the protection sheets 35 is bonded to both side surfaces of each of the hollow fiber membranes 10 arranged in line like the reed screen in the range from both side portions thereof penetrating through the adjacent oblong holes 28" to the lower-end bent portion thereof. In this construction, it is possible to protect the portion, of the hollow fiber membrane 10, which penetrates through the adjacent through-holes 28" (for example, 28a" and 28b") by a pair of the continuous protection sheets 35.

As shown in FIG. 10(B), holes 36 may be formed through the protection sheet 35 in the vicinity of the lower-end bent portion of each of the hollow fiber membranes 10 to allow the jetted gas to pass through the protection sheet 35.

The second embodiment has the same construction and operation as those of the first embodiment. Thus the same parts of the second embodiment as those of the first embodiment are denoted by the same reference numerals as those of the first embodiment, and description thereof is omitted herein.

Figure 11:
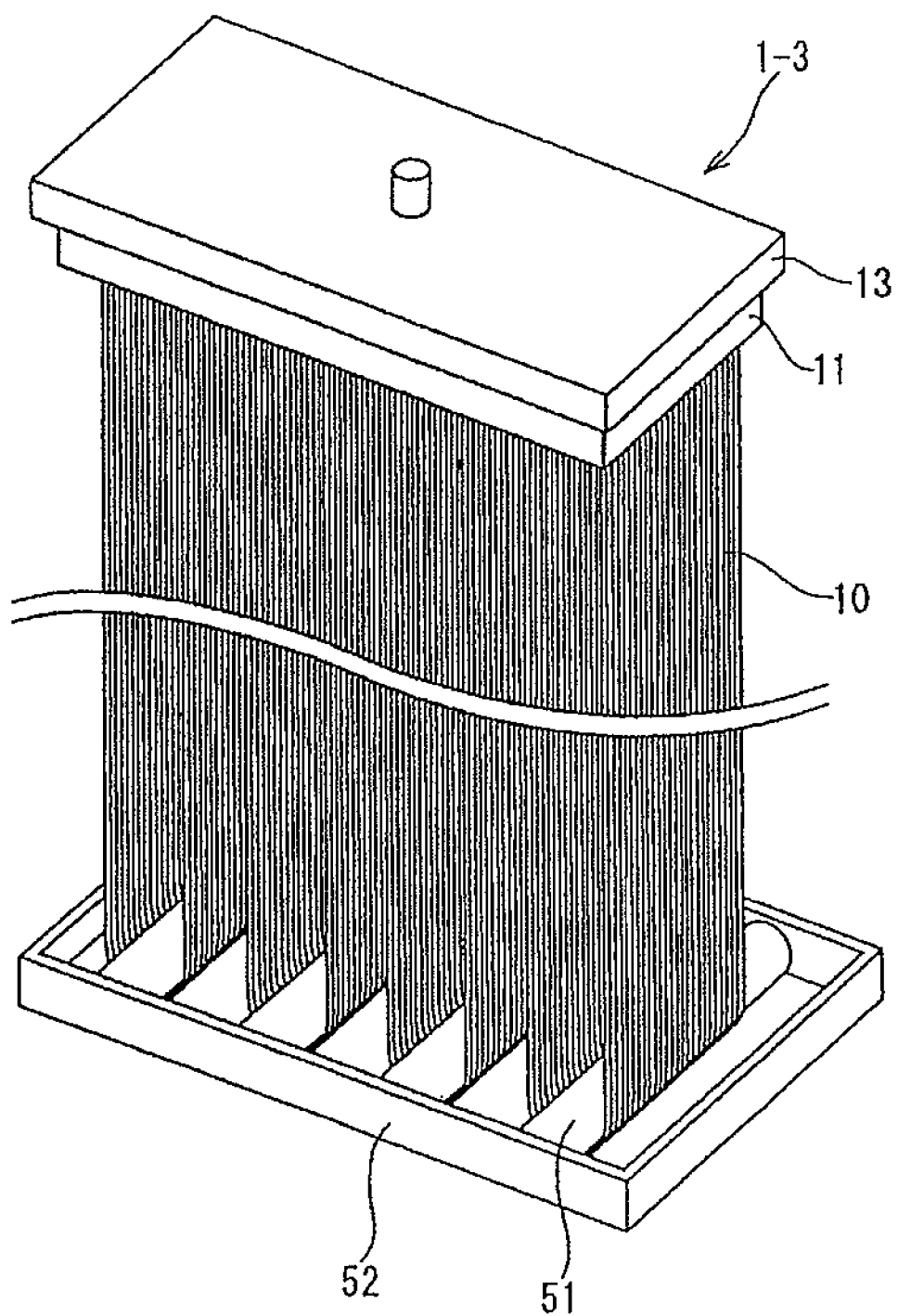
FIG. 11 is a perspective view showing a state in which a holding member of a hollow fiber membrane module of a third embodiment is mounted on hollow fiber membranes.

FIG. 11 shows a hollow fiber membrane module 1-3 for use in a filtration apparatus of the third embodiment.

In the hollow fiber membrane modules 1-3 of the third embodiment, a large number of the hollow fiber membranes 10 are fixed to the fixing member 11 disposed above the hollow fiber membranes 10 with the hollow fiber membranes 10 arranged in line like the reed screen and U-shaped by folding them double. A round rod 51 for holding the double folded hollow fiber membranes 10 is inserted through the U-shaped lower end of each of the hollow fiber membranes 10 folded double to hold the hollow fiber membranes 10 by the rod 51. The rod 51 for folding use serves as a holding member.

In the third embodiment, one hollow fiber membrane module has a plurality of units (four units in FIG. 11) arranged in parallel with one another.

Both ends of the rod 51 of each unit is fixed to a holding frame 52 to prevent the hollow fiber membranes 10 from slipping off the rod 51. It is preferable that the after the rod 51 is inserted through the U-shaped lower end of each of the hollow fiber membranes 10, the rod 51 is mounted on the rectangular holding frame 52 by fixing both ends of the rod 51 thereto.

The above-described construction provides the gap around the periphery of each of the hollow fiber membranes 10. Therefore it is possible to flow the gas jetted from the cleaning pipe (not shown) disposed at the lower end of the filtration apparatus along the peripheral surface of each of the hollow fiber membranes 10.

Figure 12A:
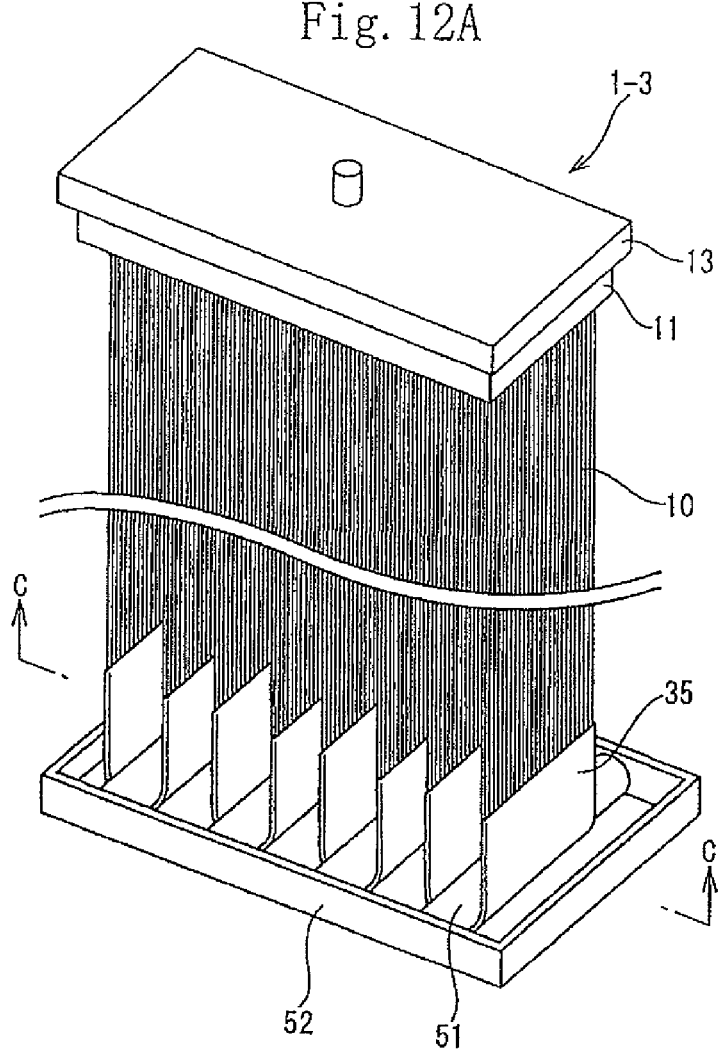
FIG. 12 shows a modification of the third embodiment, in which (A) shows a state in which a protection sheet is mounted on hollow fiber membranes; and (B) is a sectional view taken along a line C-C showing main parts of (A).
Figure 12B:
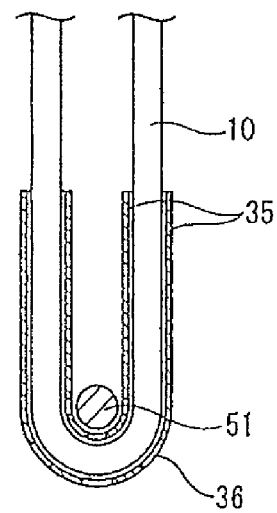

FIGS. 12(A) and 12(B) show a modification of the third embodiment. Similarly to the second modification of the second embodiment shown in FIG. 10, to protect the hollow fiber membranes 10, the protection sheet 35 is mounted at a portion of the hollow fiber membranes 10 where the hollow fiber membranes 10 contact the rod 51. As shown in FIG. 12(B), holes 36 are formed through the protection sheet 35 in the vicinity of the lower-end bent portion of each of the hollow fiber membranes 10 to allow the jetted gas to pass through the protection sheet 35.

The third embodiment has the same construction and operation as those of the first embodiment. Thus the same parts of the third embodiment as those of the first embodiment are denoted by the same reference numerals as those of the first embodiment, and description thereof is omitted herein.

Figure 13A:
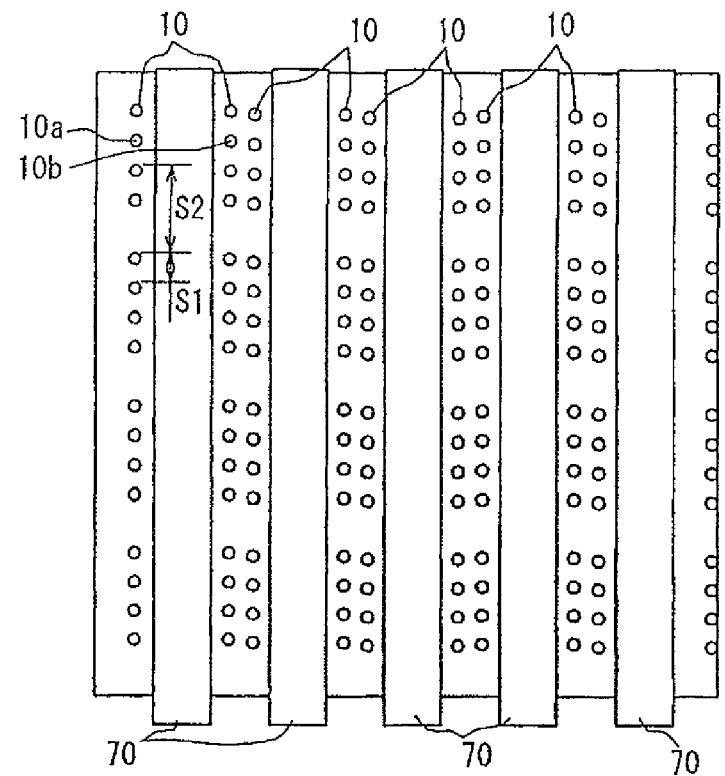
FIG. 13 shows a fourth embodiment, in which (A) is a plan view showing a state in which a rod for folding use is mounted on hollow fiber membranes; (B) is a plan view of the state shown in (A) seen sideways; and (C) is a schematic front view.
Figure 13B:
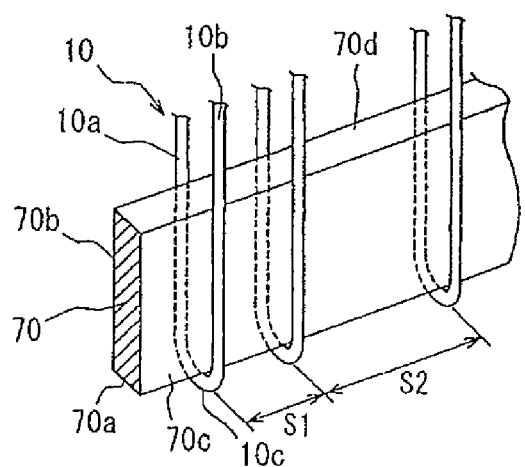
Figure 13C:
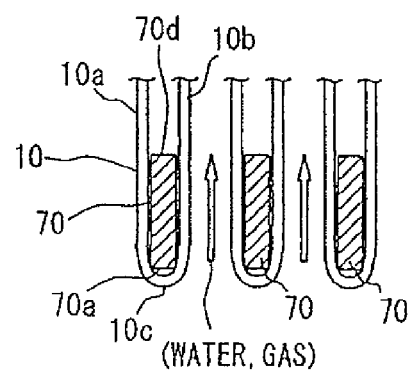

FIGS. 13(A) through 13(C) show the fourth embodiment.

In the fourth embodiment, instead of the round rod 51 of the third embodiment, to increase the sectional area of the rod so that the rod has a high strength, a sectionally rectangular rod 70 for folding use is used. The vertical dimension of the rod 70 is larger than the widthwise dimension thereof orthogonal to the vertical direction thereof. A lower surface 70a of the rod 70 contacts the inner peripheral surface of the lower-end bent portion 10c of the hollow fiber membrane 10 folded double. Thereby the hollow fiber membrane 10 keeps the double folded state, with left and right side surfaces 70b, 70c of the rod 70 confronting the side portions 10a, 10b of the hollow fiber membrane 10 respectively. Thus in a vertical region between the lower-end bent portion 10c of the hollow fiber membrane 10 and an upper surface 70d of the rod 70, a gap having the widthwise dimension between the side surfaces 70b and 70c of the rod 70 is secured between both side portions 10a and 10b of the hollow fiber membrane 10.

As shown in FIG. 13(A), a plurality of the rods 70 is disposed in parallel with one another at certain intervals. As shown in FIG. 13(B), double folded hollow fiber membranes 10 are arranged side by side along the axial direction of the rods 70. Four hollow fiber membranes 10 arranged side by side in the axial direction of the rod 70 form one block B. Inside each block B, the interval S1 between the adjacent hollow fiber membranes 10 is set short, whereas the interval S2 between the adjacent blocks B is set long. The interval S2 is set about twice larger than the interval S1. The long interval S2 provided between the adjacent hollow fiber membranes 10 arranged side by side is used as a large duct for the gas jetted from below. In the fourth embodiment, the interval S1 and the interval S2 are set to 0 mm and 4 mm respectively.

Figure 14:
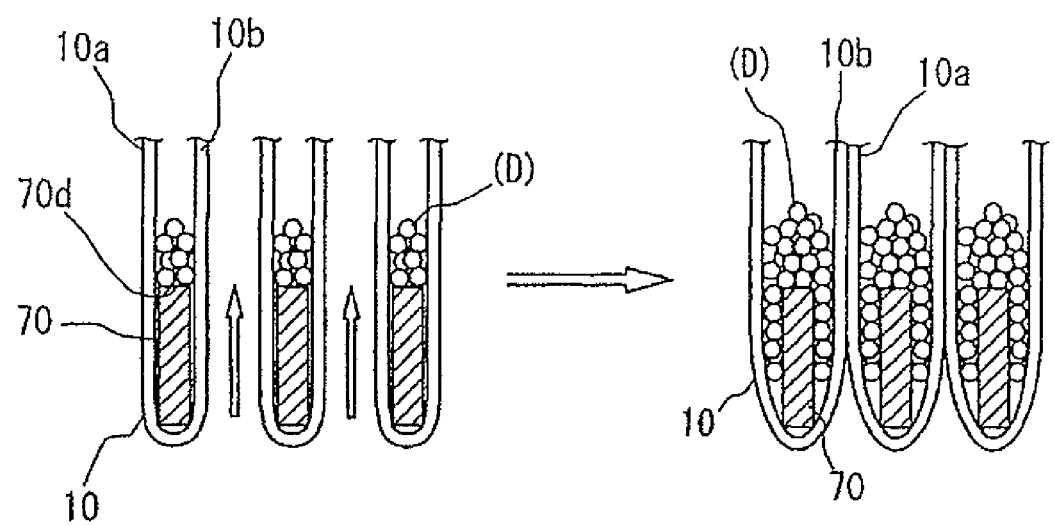
FIG. 14 shows a problem in the case where the rod for folding use is used.

The hollow fiber membrane 10 is capable of easily flexing and as shown in FIG. 14, sludge and the suspended component gradually deposit on the upper surface 70d of the rod 70 and pile thereon. As a result, both side portions 10a, 10b of the hollow fiber membrane 10 spread outward in a region above the rod 70 and contact the adjacent hollow fiber membrane 10, thus interrupting the flow of the water and the gas.

Figure 15:
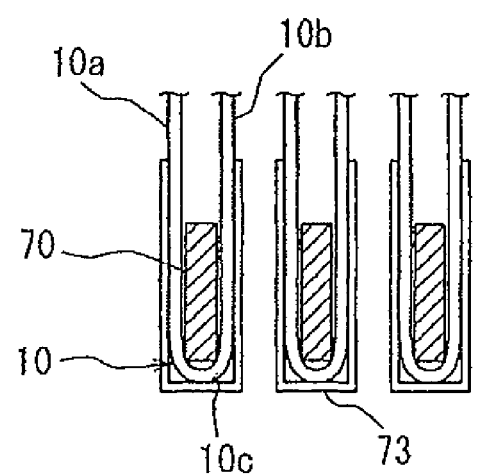
FIG. 15 is a schematic front view showing a first modification of the fourth embodiment.

FIG. 15 shows a first modification of the fourth embodiment.

In the first modification, a U-shaped spread-preventing frame 73 is so constructed that the spread-preventing frame 73 surrounds both side portions 10a, 10b of each of the hollow fiber membranes 10 from the bent portions 10c thereof to a position thereof above the rods 70. It is preferable to make the spread-preventing frame 73 of a porous plate.

FIGS. 16(A), 16(B), and 16(C) show a second modification of the fourth embodiment.

In the second modification, a duct 70f for water and a gas is formed vertically in penetration through the rod 70 to prevent the sludge and the suspended component from depositing on the upper surface 70d of the rod 70.

As shown in FIG. 16(B), the duct 70f is formed of a narrow slit disposed at a widthwise central portion of the rod 70 with the duct 70f continuous in the axial direction thereof. As shown in FIG. 16(C), the duct 70f may be formed as a plurality of round holes spaced at certain intervals in the axial direction of the rod 70.

By proving the rod 70 with the duct 70f for the water and the gas, the gas and the water which flow into the duct 70f from below the duct 70f are capable of suppressing and preventing the deposition of the sludge and the suspended component on the upper surface of the rod 70.

FIGS. 17(A) and 17(B) show a third modification of the fourth embodiment.

In the third modification, the vertical heights of rods 70 arranged in parallel with one another are alternately changed to dispose the rods 70 zigzag. By changing the heights of the adjacent rods 70 from each other, as shown in FIG. 17(B), even though the sludge and the suspended component deposit on the upper surfaces of the rods 70 and consequently both side portions 10a, 10b of each hollow fiber membrane 10 spread, it is possible to prevent the adjacent hollow fiber membranes 10 from contacting each other.

Figure 18A:
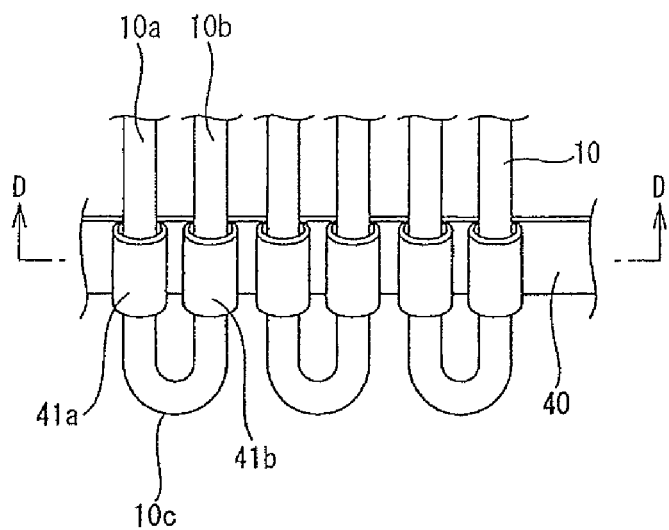
FIG. 18 shows a fifth embodiment, in which (A) shows a method of holding hollow fiber membranes; (B) is a sectional view taken along a line D-D of (A); and (C) is a perspective view showing a state in which a holding member is mounted on the hollow fiber membranes.
Figure 18B:
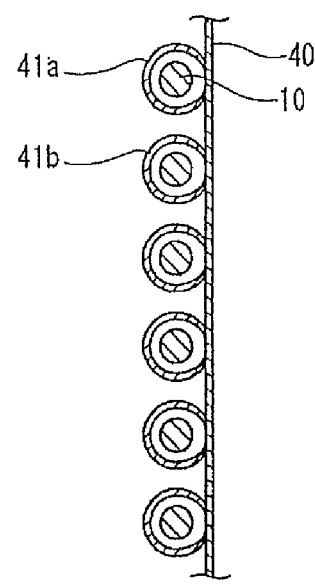
Figure 18C:
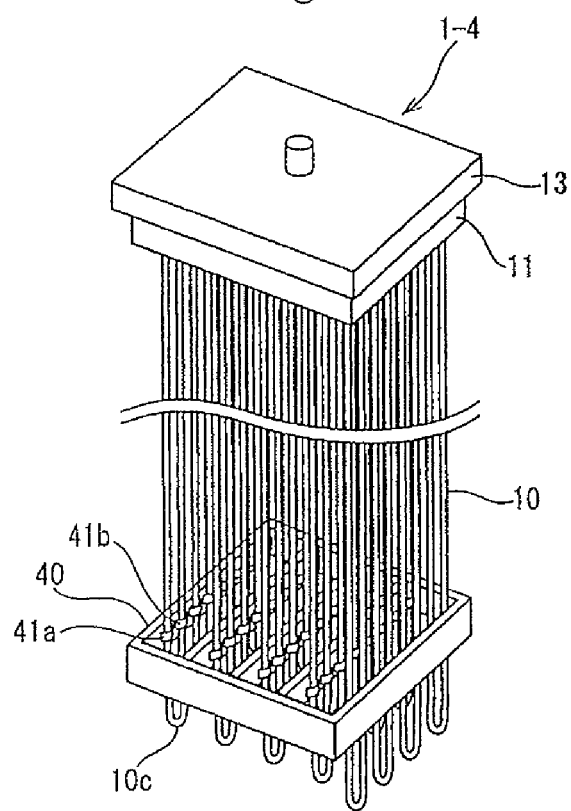

FIGS. 18(A), 18(B), and 18(C) show the fifth embodiment.

A holding member of the hollow fiber membrane 10 of a hollow fiber membrane module 1-4 of the fifth embodiment is constructed of a coupling plate 40 disposed in parallel with the axial direction of the hollow fiber membrane 10 and cylindrical portions 41, open at both ends thereof, which are projected from one surface of the coupling plate 40 with the cylindrical portions 41 spaced at certain intervals and parallel with one another. The coupling plate 40 and the cylindrical portions 41 are made of a rigid body.

Both side portions 10a, 10b of one hollow fiber membrane 10 folded double in the shape of U are penetrated through adjacent cylindrical portions 41a, 41b respectively. Similarly to the first embodiment, the lower-end bent portion 10c spans the cylindrical portions 41 between the cylindrical portions 41a, 41b, with the lower-end bent portion 10c disposed below the cylindrical portions 41a, 41b.

The inner diameter of each cylindrical portion 41 is set larger than the outer diameter of the hollow fiber membrane 10 to form a gap between the inner peripheral surface of the cylindrical portion 41 and the peripheral surface of the hollow fiber membrane 10. Similarly to the first embodiment, a cleaning pipe (not shown) is disposed below the lower-end bent portion 10c.

One hollow fiber membrane module 1-4 is provided with a plurality of coupling plates 40.

The fifth embodiment has the same construction and operation as those of the first embodiment. Thus the same parts of the fifth embodiment as those of the first embodiment are denoted by the same reference numerals as those of the first embodiment, and description thereof is omitted herein.

Figure 19A:
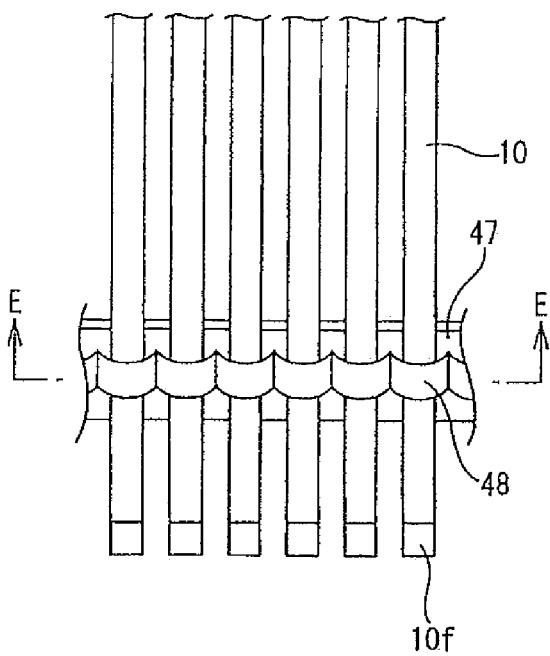
FIG. 19 shows a sixth embodiment, in which (A) shows a method of holding hollow fiber membranes; (B) is a sectional view taken along a line E-E of (A); and (C) is a perspective view showing a state in which a holding member is mounted on the hollow fiber membranes.
Figure 19B:
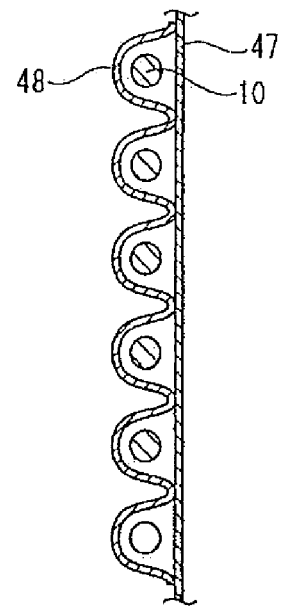
Figure 19C:
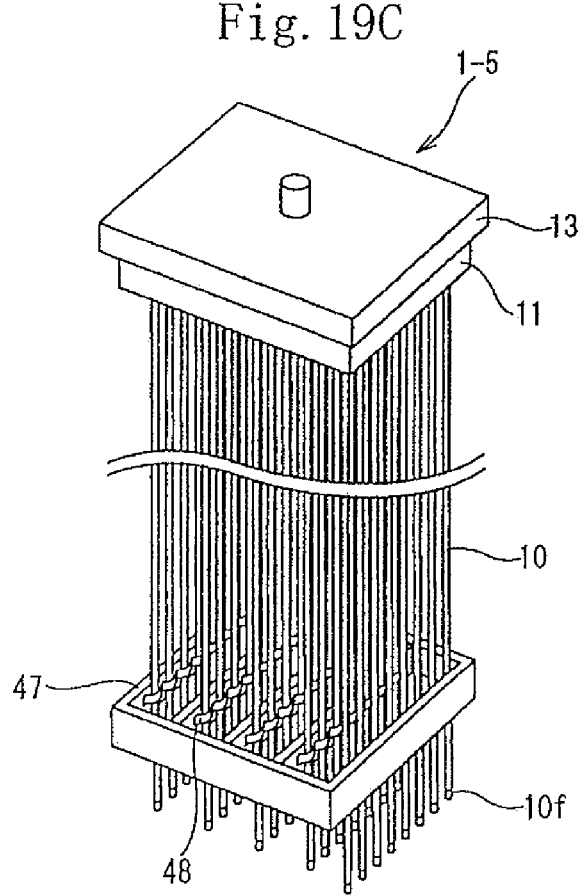

FIGS. 19(A), 19(B), and 19(C) show the sixth embodiment.

In the sixth embodiment, as shown in FIG. 19(A), different from the first embodiment through the fifth embodiment, the hollow fiber membrane 10 is not folded double, but the peripheral edge of the open lower end of each hollow fiber membrane 10 is joined to close the lower end thereof. A plurality of the hollow fiber membranes 10 each vertically linear arranged in parallel is fixed to a fixing plate 47 with a tape member 48 at a position located 10 to 50 mm above the lower end 10f of each hollow fiber membrane 10. The hollow fiber membranes 10 may be fixed to the fixing plate 47 with a sheet or the like.

Because a fixing portion of the fixing plate 47 has a slight area with respect to the area of the entire hollow fiber membrane 10, the hollow fiber membrane 10 may be held by the fixing plate 47 with the fixing portion of the fixing plate 47 in close contact with the tape member. But as shown in FIG. 19(B), by bonding the fixing plate 47 and the tape member 48 to each other at positions disposed between the adjacent hollow fiber membranes 10 by heat fusion or the like, the hollow fiber membranes 10 can be placed in position while a space is being formed around each hollow fiber membrane 10.

As shown in FIG. 19(C), one hollow fiber membrane module 1-5 is provided with a plurality of the sheet-shaped hollow fiber membranes 10 fixed to the fixing plate 47 with the hollow fiber membranes 10 spaced at predetermined intervals.

The sixth embodiment has the same construction and operation as those of the first embodiment. Thus the same parts of the sixth embodiment as those of the first embodiment are denoted by the same reference numerals as those of the first embodiment, and description thereof is omitted herein.

Figure 20:
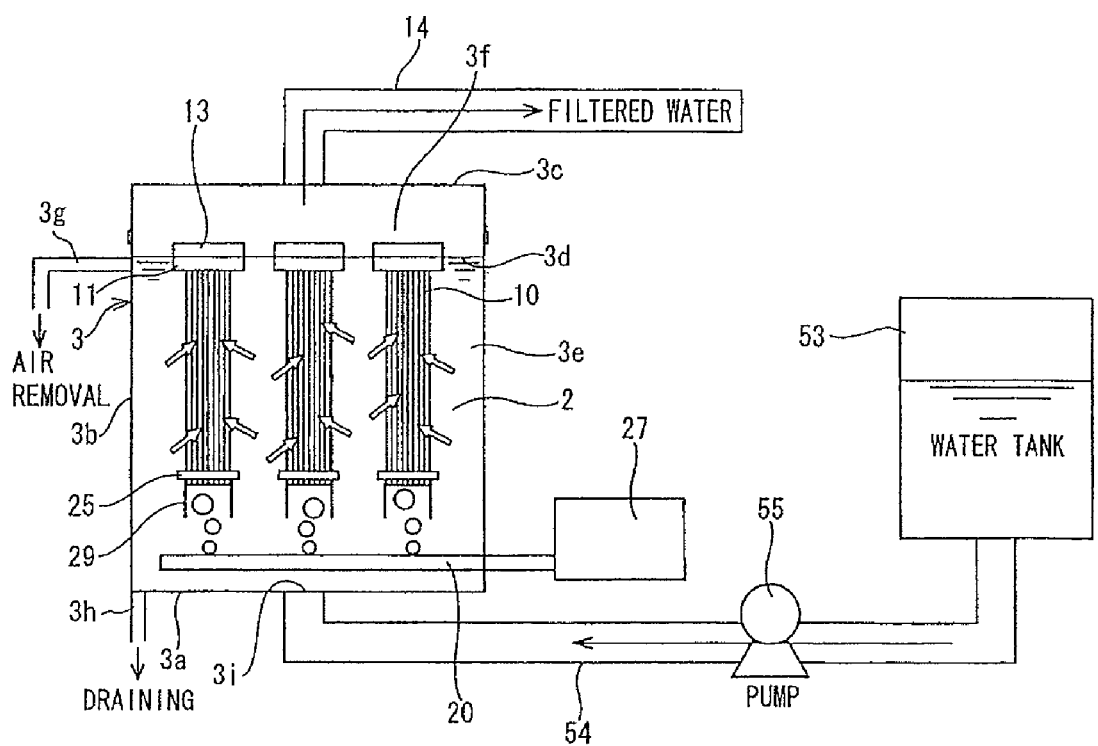
FIG. 20 is a schematic view showing a filtration apparatus of a pressurizing type of a seventh embodiment.

FIG. 20 shows the seventh embodiment of a pressurizing type filtration apparatus of the present invention.

An immersion tank 3 serving as a filtration tank of the filtration apparatus is constructed of a housing made of stainless steel. The housing is constructed of a bottom wall 3a, a peripheral wall 3b, and a cover 3c. A partitioning plate 3d for holding the fixing member 11 of the hollow fiber membrane module 1 (1A, 1B, and 1C) by fitting the fixing member 11 therein is provided in the vicinity of the upper end of the peripheral wall 3b. A filtration chamber 3e storing the to-be-treated liquid is disposed below the partitioning plate 3d. A water-collecting chamber 3f for collecting the treated liquid is disposed above the partitioning plate 3d. The partitioning plate 3d is also made of stainless steel. On the peripheral wall 3b, an air removal mechanism 3g is provided directly below the partitioning plate 3d. A drain removal mechanism 3h is provided on the bottom wall 3a.

A supply port 3i for the to-be-treated liquid 2 is provided at the center of the bottom wall 3a of the housing. The supply port 3i is communicated with a tank 53 storing the to-be-treated liquid 2 through a pipe 54. A pump 55 mounted on the pipe 54 feeds the to-be-treated liquid 2 under pressure into the immersion tank 3. More specifically, in the filtration apparatus of the seventh embodiment, by feeding the pressurized to-be-treated liquid 2 into the immersion tank 3, the to-be-treated liquid 2 is fed through the hollow fiber membrane 10 from the peripheral surface to the inner peripheral surface thereof so that the to-be-treated liquid 2 is filtered under an external pressure.

The blower 27 supplies pressurized air to the cleaning pipe 20 serving as the pressurized air supply pipe. The supplied air stored inside the filtration chamber 3e can be discharged outside the immersion tank 3 from the air removal mechanism 3g. The suspended substance generated by the cleaning can be discharged outside the immersion tank 3 from the drain removal mechanism 3h.

The filtrate water fed to the water-collecting chamber 3f from the water-collecting header 13 communicating with the opening of each hollow fiber membrane 10 disposed at its upper end is fed to the water-collecting pipe 14.

The filtration apparatus of the seventh embodiment is different from that of the first embodiment shown in FIG. 1 in that the former is of the pressurizing type and the latter is of the sucking type. But the seventh embodiment has the same construction and operation as those of the first embodiment. Thus the same parts of the seventh embodiment as those of the first embodiment are denoted by the same reference numerals as those of the first embodiment, and description thereof is omitted herein.

Examples of the present invention and comparison examples are shown below.

FIG. 21 shows the filtration apparatus of the example 1. FIG. 22 shows the filtration apparatus of the example 2.

EXAMPLE 1

Figure 21C:
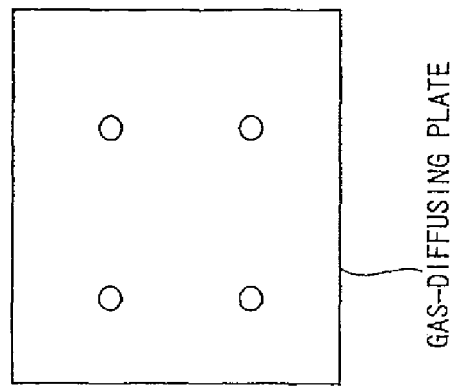
FIG. 21 shows a filtration apparatus of an example 1, in which (A) shows a method of diffusing air for a hollow fiber membrane module; (B) shows a method of holding a lower end of a hollow fiber membrane of the hollow fiber membrane module; and (C) is a plan view of an air-diffusing plate.
Figure 21B:
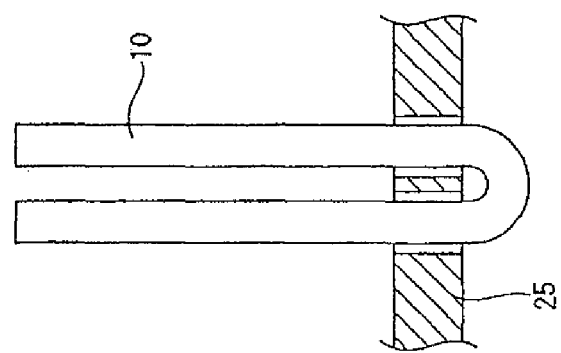

As the hollow fiber membrane 10, drawn hollow fiber membrane made of PTFE having an inner diameter of 1 mm, an outer diameter of 2 mm, a porosity of 75%, a pore diameter of 0.45 μm, and an effective length of 1500 mm is used. One hollow fiber membrane module 1 has 945 hollow fiber membranes. As shown in FIG. 21(B), as the holding member 25, a plate, made of PVC resin, having a dimension of 150 mm×150 mm (length×breadth) through which 945 through-holes having an outer diameter of 3 mm were formed and having a thickness of 5 mm was used.

Both ends of one double folded hollow fiber membrane were inserted through a pair of the adjacent through-holes with the hollow fiber membrane forming a U shape at the central position thereof.

After both ends of the U-shaped hollow fiber membranes were inserted into a water-collecting header 13 made of ABS resin having a groove formed therein, with both ends thereof bundled and arranged squarely, both ends thereof were fixed with resin (urethane resin) for fixing use with both ends thereof kept open to form the fixing member 11.

A skirting part (plate) 29 having a height of 200 mm was vertically projected from a lower position of the holding member along the periphery thereof. The skirting part 29 was shaped squarely by bringing four corners thereof in close contact. Inside the space surrounded with the skirting part (plate) 29, a plate (air-diffusing plate 30) having four holes each having a diameter of 6 mm formed therethrough was fixed to the holding member 25 at a position spaced at an interval of 50 mm downward from the holding member 25, as shown in FIG. 21(C). The position of the rectangular fixing member 11 and that of the holding member 25 were fixed with four supporting rods (not shown) to form the hollow fiber membrane module 1.

Figure 21A:
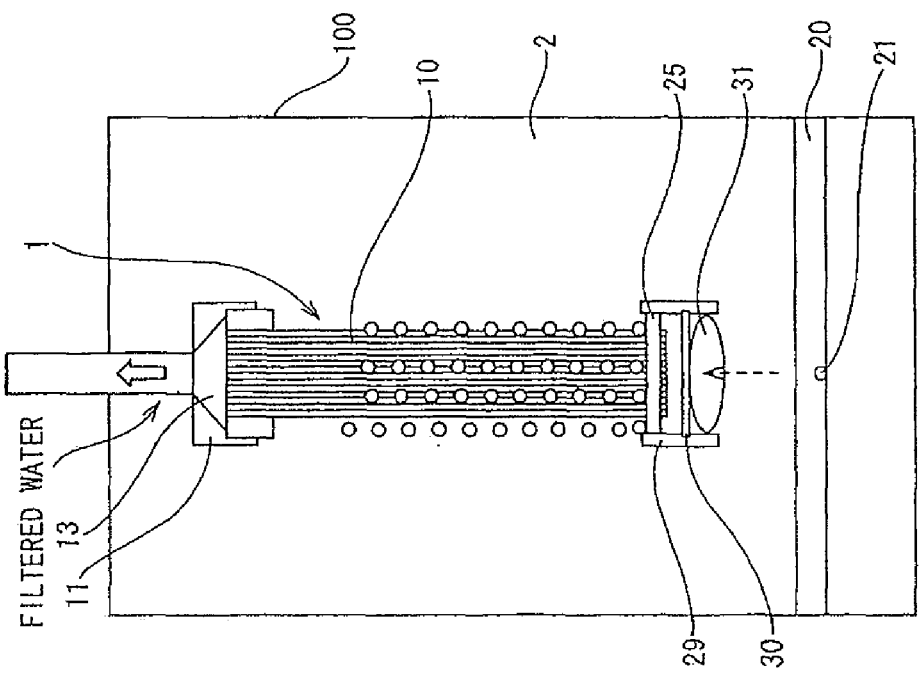
Figure 23:
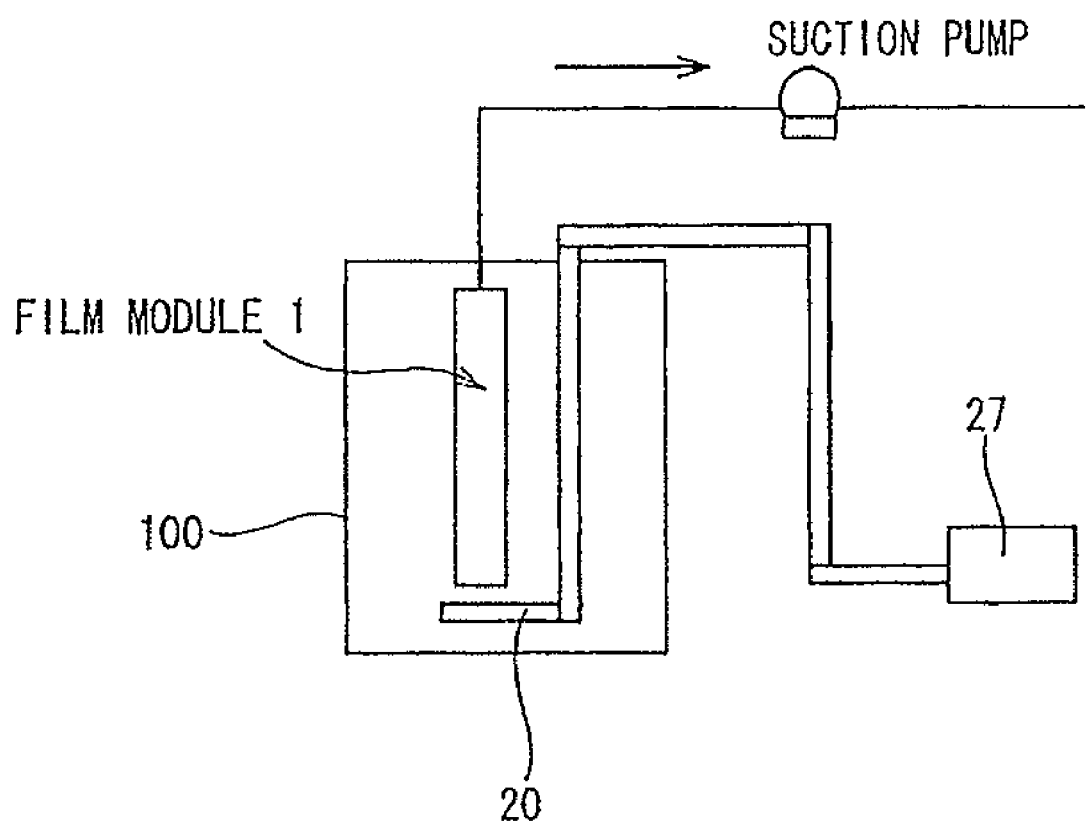
FIG. 23 shows an experiment method of the examples 1 and 2.

As shown in FIGS. 21(A) and 23, the hollow fiber membrane module 1 was vertically set inside an immersion tank 100. At a position spaced at an interval of 300 mm from the lower end of the hollow fiber membrane module 1, an air supply pipe (air-diffusing pipe) 20 having an outer diameter of 30 mm was disposed. Air of 4 $Nm^3$/hour was discharged from the holes, having a diameter of 6 mm, formed through the pipe by using the blower 27. After the air was stayed in the space surrounded with the air-diffusing plate 30 and the skirting part 29 of the hollow fiber membrane module 1, the air was supplied to the holding member 25 and the hollow fiber membranes 10 from the holes of the air-diffusing plate 30.

By driving a suction pump provided with a pressure gauge, suction filtration was carried out for 30 days by a fixed flow rate drive. As the to-be-treated liquid 2, waste water (10000 mg/L) containing bacteria to be treated by the membrane separation active sludge method was used.

EXAMPLE 2

Figure 22C:
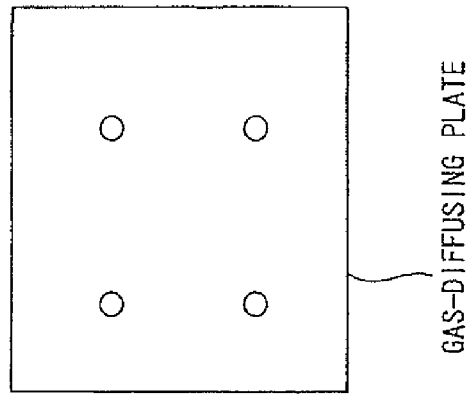
FIG. 22 shows a filtration apparatus of an example 2, in which (A) shows a method of diffusing air for a hollow fiber membrane module; (B) shows a method of holding a lower end of a hollow fiber membrane of the hollow fiber membrane module; and (C) is a plan view of an air-diffusing plate.
Figure 22B:
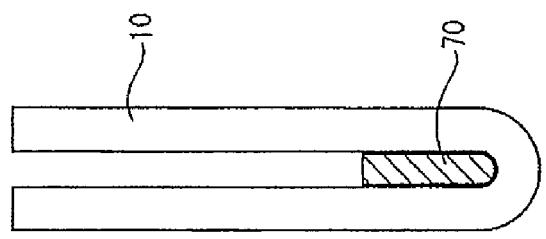
Figure 22A:
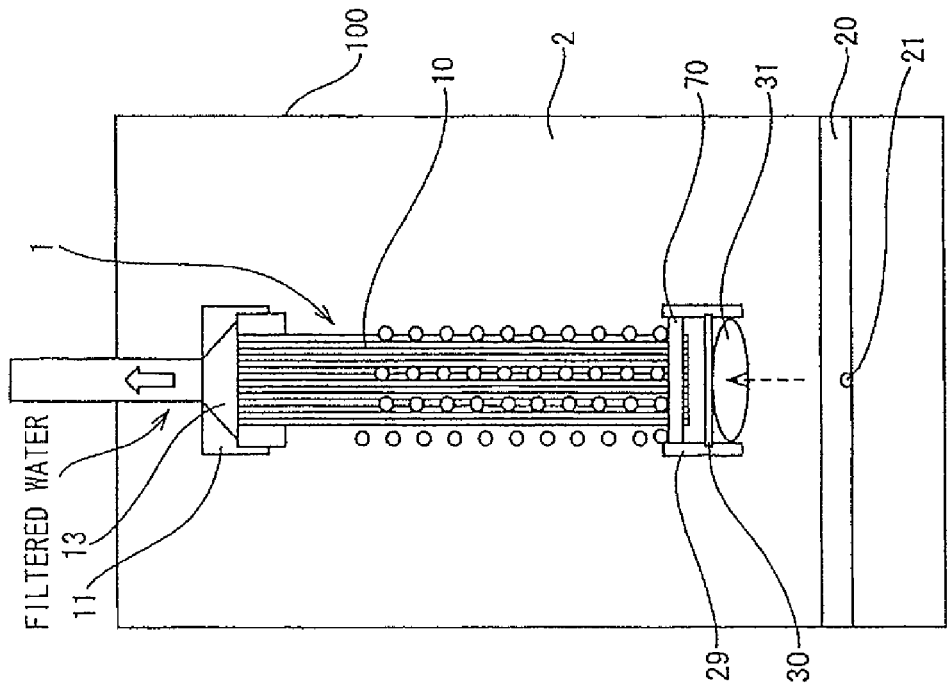

As shown in FIGS. 22(A), 22(B), and 22(C), the hollow fiber membrane 10 was used similarly to the example 1. Instead of the holding member 25 of the example 1, the sectionally rectangular rod for folding use 70 made of ABS resin was used. By using the rod 70, the hollow fiber membrane 10 was bent so that it was U-shaped. After both ends of the U-shaped hollow fiber membranes were inserted into the water-collecting header 13 made of ABS resin having a groove formed therein, with both ends thereof bundled and arranged squarely, both ends thereof were fixed with resin (urethane resin) for fixing use with both ends thereof kept open to form the fixing member 11 of the hollow fiber membrane module. Thereby the module was formed. The number of the hollow fiber membranes was set to 945, similarly to the example 1. Sucking filtration was performed by setting other conditions similarly to those of the example 1.

COMPARISON EXAMPLE 1

FIGS. 24(A), (B), (C) show a comparison example. Hollow fiber membranes similar to those of the example 1 were used for the same water-collecting header 13 as that of the example 1 made of ABS. The hollow fiber membranes 10 were densely inserted into the water-collecting header 13 at the same filling rate as that of the example 1, with the upper ends of the hollow fiber membranes 10 open. As shown in FIG. 24(B), the lower ends of the hollow fiber membranes 10 were sealed. The upper and lower ends of the hollow fiber membranes were fixed with resin (urethane resin) for fixing use to form the hollow fiber membrane module as the fixing member 11 and a lower-end fixing member 60. The number of the hollow fiber membranes was set to 945 similarly to the example 1. An air supply pipe was inserted into a gap between adjacent bundles of membranes to perform bubbling and sucking filtration. Other conditions were similar to those of the example 1.

(Filtration Condition)

Set filtration flow rate: 6 m³/day

Temperature of water: 20 to 28° C. (in graph, corrected value at 25° C.)

Figure 25:
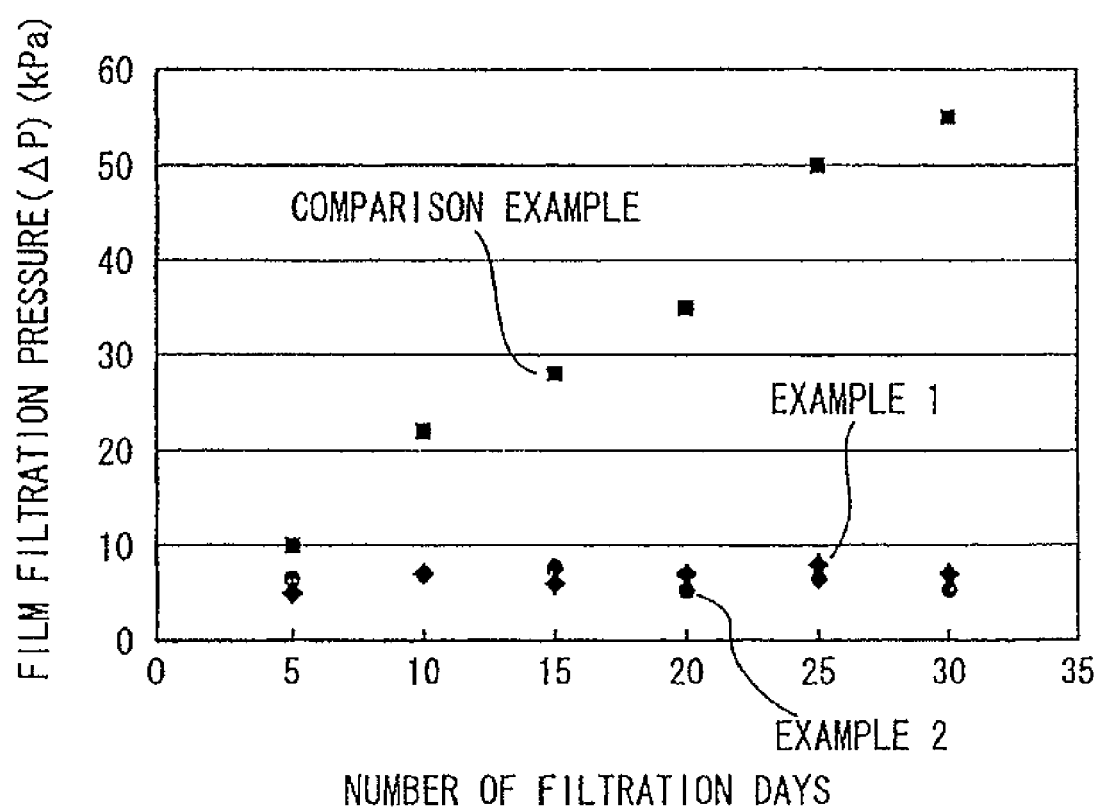
FIG. 25 shows the relationship between the number of filtration days and membrane filtration pressure in the examples 1, 2 and the comparison example 1.
Figure 26:
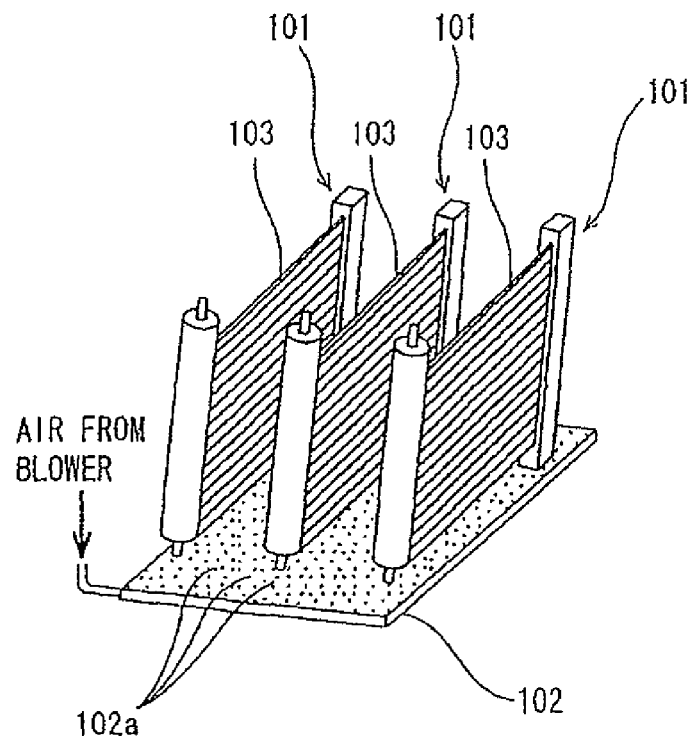
FIG. 26 shows a conventional art.
Figure 27:
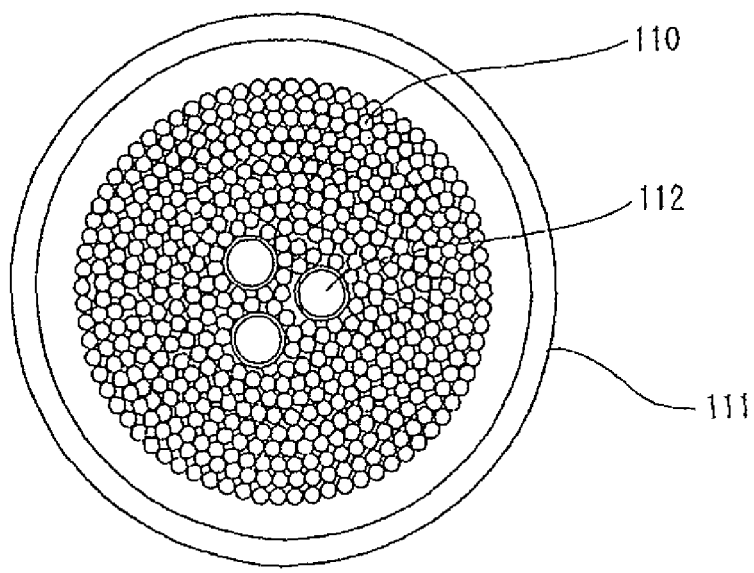
FIG. 27 shows another conventional art.

Back washing: frequency; once/10 minutes, pressure; 200 kPa, period of time; 30 seconds FIG. 25 shows the results of the examples 1, 2 and the comparison example 1, thus showing the relationship between the number of filtration days and membrane filtration pressure. In the examples 1 and 2, the membrane filtration pressure rose a little at the early stage of the filtration, but became almost constant after the elapse of 10 filtration days and thereafter maintained favorable filtration performance until 30 filtration days.

On the other hand, in the comparison example 1, with the elapse of filtration days, the value of the membrane filtration pressure continued to rise and the filtration performance did not recover nor was maintained. The filtration stopped in 30 days.

INDUSTRIAL APPLICABILITY

In the filtration apparatus of the present invention, by imparting air supplied by the gas-jetting means to the surfaces of the hollow fiber membranes, it is possible to efficiently remove the suspended component which has deposited on the surfaces of the hollow fiber membranes or in the gaps between the hollow fiber membranes by the peel-off. Therefore the filtration apparatus can be suitably used in not only a water-cleaning field but also in a sewage field to be treated by the membrane separation active sludge method. The filtration apparatus is also applicable to fields of treating industrial wastewater, stock farming wastewater, and the like.

What is claimed is:

1. A sucking filtration apparatus of an immersion type or a filtration apparatus of an external pressure type for performing solid-liquid separation by immersing a plurality of hollow fiber membranes in a to-be-treated liquid containing a suspended component so that a treated liquid permeates said hollow fiber membranes, comprising:

said hollow fiber membranes folded double;

a treated liquid collection means communicated with an open end, of each of said hollow fiber membranes, which is disposed opposite to a bent side of each of said hollow fiber membranes;

a holding member for holding a bent portion of each of said hollow fiber membranes with a gap formed between said bent portion of each of said hollow fiber membranes and said holding member; and a gas-jetting means for jetting a cleaning gas from said bent side of each of said hollow fiber membranes to a side of said open end of each of said hollow fiber membranes, wherein a gap for flowing said gas jetted by said gas-jetting means is formed between said hollow fiber membranes held by said holding member and said holding member or/and in at least one part of gaps between said hollow fiber membranes, and wherein said holding member consists of a plate disposed in a direction orthogonal to said axial direction of said hollow fiber membranes; and said plate has a plurality of a pair of through-holes proximately formed for one or a plurality of said hollow fiber membranes with adjacent pairs of said through-holes spaced at a predetermined interval; and both sides of said bent portion of one or a plurality of said hollow fiber membranes are inserted through a pair of said through-holes with a gap provided between said both sides of each of said hollow fiber membranes.

2. A sucking filtration apparatus of an immersion type or a filtration apparatus of an external pressure type for performing solid-liquid separation by immersing a plurality of hollow fiber membranes in a to-be-treated liquid containing a suspended component so that a treated liquid permeates said hollow fiber membranes, comprising:

said hollow fiber membranes folded double;

a treated liquid collection means communicated with an open end, of each of said hollow fiber membranes, which is disposed opposite to a bent side of each of said hollow fiber membranes;

a holding member for holding a bent portion of each of said hollow fiber membranes with a gap formed between said bent portion of each of said hollow fiber membranes and said holding member; and a gas-jetting means for jetting a cleaning gas from said bent side of each of said hollow fiber membranes to a side of said open end of each of said hollow fiber membranes, wherein a gap for flowing said gas jetted by said gas-jetting means is formed between said hollow fiber membranes held by said holding member and said holding member or/and in at least one part of gaps between said hollow fiber membranes, wherein a plurality of said double folded hollow fiber membranes is arranged side by side like a reed screen; and said holding member consisting of a round rod or a flat plate-shaped rod is inserted between both side portions of each of said hollow fiber membranes confronting each other with said bent portion thereof disposed therebetween to hold said bent portion, and further comprising a U-shaped spread-preventing frame configured such that vertical portions of the frame extend to a position higher than the rod and prevent the double folded hollow fiber membranes from unfolding.

3. A sucking filtration apparatus of an immersion type or a filtration apparatus of an external pressure type for performing solid-liquid separation by immersing a plurality of hollow fiber membranes in a to-be-treated liquid containing a suspended component so that a treated liquid permeates said hollow fiber membranes, comprising:

said hollow fiber membranes folded double;

a treated liquid collection means communicated with an open end, of each of said hollow fiber membranes, which is disposed opposite to a bent side of each of said hollow fiber membranes;

a holding member for holding a bent portion of each of said hollow fiber membranes with a gap formed between said bent portion of each of said hollow fiber membranes and said holding member; and a gas-jetting means for jetting a cleaning gas from said bent side of each of said hollow fiber membranes to a side of said open end of each of said hollow fiber membranes, and wherein a gap for flowing said gas jetted by said gas-jetting means is formed between said hollow fiber membranes held by said holding member and said holding member or/and in at least one part of gaps between said hollow fiber membranes wherein said holding member comprises a coupling plate disposed in parallel with an axial direction of said hollow fiber membrane and a plurality of cylindrical portions, open at both ends thereof, which project from one surface of said coupling plate in such a way that a pair of said cylindrical portions spaced closely is provided for each of said hollow fiber membranes with adjacent pairs of said cylindrical portions spaced at a predetermined interval; both sides of a bent portion of each of said hollow fiber membranes are inserted through through-holes of a pair of said cylindrical portions respectively with a gap provided between both side portions of said bent portion of each of said hollow fiber membranes; and said bent portion is spanned between a pair of said cylindrical portions to hold said bent portion.

* * * * *